(12) United States Patent
Huang et al.

(10) Patent No.: US 12,132,388 B2
(45) Date of Patent: Oct. 29, 2024

(54) THREE-PHASE POWER SUPPLY CONVERSION CIRCUIT, CIRCUIT CONTROL METHOD, CIRCUIT BOARD AND AIR CONDITIONER

(71) Applicants: CHONGQING MIDEA AIR CONDITIONING EQUIPMENT CO., LTD., Chongqing (CN); GD MIDEA AIR-CONDITIONING EQUIPMENT CO., LTD., Foshan (CN)

(72) Inventors: Zhaobin Huang, Chongqing (CN); Tan Long, Chongqing (CN); Ming Zhao, Chongqing (CN); Jianning Yang, Chongqing (CN); Jinqing Xu, Chongqing (CN); Xianjie Zeng, Chongqing (CN); Zhaojing Huo, Chongqing (CN); Xianshi Wen, Chongqing (CN)

(73) Assignees: CHONGQING MIDEA AIR CONDITIONING EQUIPMENT CO., LTD., Chongqing (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 18/021,182

(22) PCT Filed: Sep. 13, 2021

(86) PCT No.: PCT/CN2021/118016
§ 371 (c)(1),
(2) Date: Feb. 14, 2023

(87) PCT Pub. No.: WO2022/068565
PCT Pub. Date: Apr. 7, 2022

(65) Prior Publication Data
US 2023/0318433 A1 Oct. 5, 2023

(51) Int. Cl.
*H02M 1/00* (2007.01)
*F24F 11/88* (2018.01)
*H02M 7/217* (2006.01)

(52) U.S. Cl.
CPC .......... *H02M 1/0043* (2021.05); *F24F 11/88* (2018.01); *H02M 7/2173* (2013.01)

(58) Field of Classification Search
CPC .... H02M 1/00; H02M 1/0043; H02M 7/2173; H02M 7/217; F24F 11/88
See application file for complete search history.

(56) References Cited

U.S. PATENT DOCUMENTS

| 2010/0109587 A1 | 5/2010 | Iwahori et al. |
| 2011/0116293 A1 | 5/2011 | Tabata et al. |
| 2013/0083571 A1 | 4/2013 | Pu et al. |

FOREIGN PATENT DOCUMENTS

| CN | 101009432 A | 8/2007 |
| CN | 103187887 A | 7/2013 |

(Continued)

OTHER PUBLICATIONS

Wei-Zhang, A Hybrid Control Method To Suppress the Three-Time Fundamental Frequency Neutral-Point Voltage Fluctuation in a Vienna Rectifier, Jun. 2016, EEE Journal, vol. 04,.*

(Continued)

*Primary Examiner* — Robert L Deberadinis
(74) *Attorney, Agent, or Firm* — Anova Law Group, PLLC

(57) ABSTRACT

A three-phase power supply conversion circuit includes rectifier, energy storage, direct-current load, and control modules. The rectifier module includes a three-phase rectifier bridge including three bridge arms connected in parallel to each other, and a bidirectional switch assembly including three bidirectional switches. One ends of the three bidirectional switches are connected to midpoints of the three (Continued)

bridge arms, respectively. The energy storage module is connected to a direct-current output end of the rectifier module and includes first and second capacitors connected in series to each other. Other ends of the three bidirectional switches are connected between the first and second capacitors. The control module is connected to the bidirectional switch assembly and configured to control the bidirectional switches according to phase voltages of a three-phase alternating-current power supply, to maintain a voltage between two ends of the first or second capacitor at a target voltage.

19 Claims, 17 Drawing Sheets

(56) References Cited

FOREIGN PATENT DOCUMENTS

| | | |
|---|---|---|
| CN | 110521101 A | 11/2019 |
| CN | 110581643 A | 12/2019 |
| CN | 110612658 A | 12/2019 |
| CN | 110677059 A | 1/2020 |
| JP | 2017184397 A | 10/2017 |
| WO | 2017024642 A1 | 2/2017 |

OTHER PUBLICATIONS

The World Intellectual Property Organization (WIPO) International Search Report for PCT/CN2021/118016 Nov. 26, 2021 9 pages (including English translation).

The China National Intellectual Property Administration (CNIPA) The First Office Action for Chinese Application 202011066402.3 May 24, 2023 14 Pages (With Translation).

The European Patent Office (EPO) Communication pursuant to Rule70(2) and 70a(2) EPC for EP Application No. 21874226.0 Jan. 9, 2024 9 Pages.

Anderson J Azurza et al., "New Synergetic Control of a 20KW Isolated VIENNA Rectifier Front-End EV Battery Charger", Jun. 17, 2019, pp. 1-8, 2019 20th Workshop on Control and Modeling for Power Electronics (Compel).

Song Wei-Zhang et al., "A Hybrid Control Method to Suppress the Three-Time Fundamental Frequency Neutral-Point Voltage Fluctuation in a VIENNA Rectifier", Jun. 1, 2016, pp. 468-480, vol. 4 No.2, IEEE Journal of Emerging and Selected Topics in Power Electronics, NJ, USA.

Leibl Michael et al., "Sinusoidal Input Current Discontinuous Conduction Mode Control of the Vienna Rectifier", Nov. 1, 2017, pp. 8800-8812, vol. 32 No. 11, IEEE Transactions on Power Electronics, Institute of Electrical and Electronics Engineers, USA.

* cited by examiner

THREE-PHASE POWER SUPPLY CONVERSION CIRCUIT, CIRCUIT CONTROL METHOD, CIRCUIT BOARD AND AIR CONDITIONER

CROSS-REFERENCE TO RELATED APPLICATIONS

The present application is a National Stage Entry under 35 U.S.C. § 371 of International Application No. PCT/CN2021/118016, filed on Sep. 13, 2021, which claims priority to Chinese Application No. 202011066402.3, filed on Sep. 30, 2020 and entitled "THREE-PHASE POWER SUPPLY CONVERSION CIRCUIT, CIRCUIT CONTROL METHOD, CIRCUIT BOARD AND AIR CONDITIONER," the entire contents of both of which are incorporated herein by reference.

TECHNICAL FIELD

The present disclosure relates to the field of air conditioner technologies, and in particular to a three-phase power supply conversion circuit, a circuit control method, a circuit board and an air conditioner.

BACKGROUND

In a high-efficiency variable-frequency air-conditioning system powered by a three-phase power supply, except for a variable-frequency compressor load, a direct-current fan load is also provided. Some air-conditioning systems are provided with one direct-current fan, and some air-conditioning systems are provided with two or more direct-current fans. A solution in the existing technology is generally as follows: the three-phase power supply outputs a voltage of a high-voltage direct-current bus through a passive PFC rectifier circuit or a two-level active PFC rectifier circuit, and the variable-frequency compressor load is connected to the voltage of the high-voltage direct-current bus. However, the direct-current fan load is powered by an additional independent phase voltage after rectification instead of being powered from the voltage of the high-voltage direct-current bus.

The reason for such a design is that: an Intelligent Power Module (IPM) driving the direct-current fan has insufficient withstand voltage, and cannot be directly powered from the high-voltage direct-current bus. Generally, an effective value of a three-phase line voltage is nominally 380 V, and then the voltage of the high-voltage direct-current bus after rectification is 537 V. With 10% allowable error of power supply voltage fluctuation, the voltage of the high-voltage direct-current bus may probably reach 590 V. Under the control of the active PFC, the voltage of the direct-current bus can be further increased. A withstand voltage of a high-voltage electrolytic capacitor is generally lower than 450 V. Under this application scene, a withstand voltage of a high-voltage electrolytic capacitor of a direct-current bus has to be increased by a two-stage series connection mode, and the withstand voltage of the two-stage series connection can reach 900 V theoretically. However, the withstand voltage of the IPM module used for driving the direct-current fan is generally 500 V or 600 V, and there is a withstand voltage derating requirement on the IPM module, thus an input voltage of the IPM module used for driving the direct-current fan is generally lower than 450V in fact. As the voltage of the high-voltage direct-current bus is higher than the input voltage of the IPM module used for driving the direct-current fan, the IPM module cannot be directly powered from the high-voltage direct-current bus.

In the solution of the existing technology, an independent phase voltage is rectified and used to supply power to the direct-current fan load, such that the rectified direct-current voltage can meet a requirement of the withstand voltage of the IPM module of the direct-current fan. However, this also results in a load of the phase supplying power to the direct-current fan being higher than those of the other two phases, and this additional load does not undergo the two-level active PFC circuit, resulting in larger harmonic in the current of this phase, thus the three phase currents are not balanced, and it is difficult to meet the harmonic requirements of International Electro technical Commission (IEC).

SUMMARY

The following is an overview of the subject described in detail herein. The summary is not intended to limit the scope of protection of the claims.

The present disclosure aims at solving at least one of the technical problems in the existing technology, and provides a three-phase power supply conversion circuit, a circuit control method, a circuit board, and an air conditioner capable of providing a stable voltage, balancing three phase currents and effectively reducing a harmonic.

In a first aspect, an embodiment of the present disclosure provides a three-phase power supply conversion circuit, which includes a rectifier module, an energy storage module, a direct-current load module and a control module;

the rectifier module includes a three-phase rectifier bridge and a bidirectional switch assembly, and the three-phase rectifier bridge includes a first bridge arm, a second bridge arm and a third bridge arm which are connected in parallel to each other; and the bidirectional switch assembly includes a first bidirectional switch, a second bidirectional switch and a third bidirectional switch, one end of the first bidirectional switch is connected to a midpoint of the first bridge arm, one end of the second bidirectional switch is connected to a midpoint of the second bridge arm, and one end of the third bidirectional switch is connected to a midpoint of the third bridge arm;

the energy storage module is connected to a direct-current output end of the rectifier module, the energy storage module includes a first capacitor and a second capacitor which are connected in series to each other, and the other end of the first bidirectional switch, the other end of the second bidirectional switch and the other end of the third bidirectional switch are all connected between the first capacitor and the second capacitor;

the direct-current load module includes a first direct-current load connected in parallel to the first capacitor or a second direct-current load connected in parallel to the second capacitor; and the control module is connected to the bidirectional switch assembly and used for controlling the first bidirectional switch, the second bidirectional switch and the third bidirectional switch according to three phase voltages of a three-phase alternating-current power supply, such that a voltage between two ends of the first capacitor or a voltage between two ends of the second capacitor is maintained at a target voltage.

The three-phase power supply conversion circuit provided by the embodiments of the present disclosure at least has the following beneficial effects: by connecting the first direct-current load in parallel to two ends of the first capacitor or connecting the second direct-current load in parallel to two ends of the second capacitor, and controlling the first bidirectional switch, the second bidirectional switch and the third bidirectional switch according to the three phase voltages of the three-phase alternating-current power supply, the voltage between two ends of the first capacitor or the voltage between two ends of the second capacitor is maintained at the target voltage, such that the voltage between two ends of the first capacitor or the second capacitor remains stable, which means that direct-current loads with a low voltage level such as a direct-current fan and an auxiliary power supply may be powered through the first capacitor or the second capacitor, and three phase currents of the three-phase alternating-current power supply can be balanced, thus avoiding a harmonic of certain one phase current from being significantly large and effectively reducing the harmonic.

In the three-phase power supply conversion circuit above, the controlling the first bidirectional switch, the second bidirectional switch and the third bidirectional switch according to the three phase voltages of the three-phase alternating-current power supply, includes:

when a difference value between a maximum phase voltage and an intermediate phase voltage of the three-phase alternating-current power supply is smaller than a first voltage value, and a difference value between the intermediate phase voltage and a minimum phase voltage of the three-phase alternating-current power supply is smaller than a second voltage value, controlling on-off of the bidirectional switch assembly with a preset modulation strategy by the control module;

where the preset modulation strategy is that: a bidirectional switch corresponding to the intermediate phase voltage of the three-phase alternating-current power supply is kept on, a bidirectional switch corresponding to one phase voltage except for the intermediate phase voltage in the three-phase alternating-current power supply is kept off, and a bidirectional switch corresponding to the other phase voltage except for the intermediate phase voltage in the three-phase alternating-current power supply is alternately turned on and off.

The on-off of the bidirectional switch assembly is controlled through the preset modulation strategy within a time range in which the following conditions are met: the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value. The first capacitor or the second capacitor is charged within the time range, such that the voltage between two ends of the first capacitor or the second capacitor remains stable, then the direct-current loads with the low voltage level such as the direct-current fan and the auxiliary power supply may be powered through the first capacitor or the second capacitor, and the three phase currents of the three-phase alternating-current power supply can be balanced, thus avoiding a harmonic of certain one phase current from being significantly large and effectively reducing the harmonic.

In the three-phase power supply conversion circuit above, the direct-current load module includes the first direct-current load connected in parallel to the first capacitor, and the preset modulation strategy is specifically that:

the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off.

When the first direct-current load is connected in parallel to two ends of the first capacitor, which means that the first direct-current load is powered through the first capacitor, in this case the preset modulation strategy is that: the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off, and thus within the time range in which the conditions that the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value are met, the first capacitor can be charged, such that the voltage of the first capacitor remains stable, and the three phase currents of the three-phase alternating-current power supply can be balanced, thus avoiding a harmonic of certain one phase current from being significantly large and effectively reducing the harmonic.

In the three-phase power supply conversion circuit above, the direct-current load module includes the second direct-current load connected in parallel to the second capacitor, and the preset modulation strategy is specifically that:

the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off.

When the second direct-current load is connected in parallel to two ends of the second capacitor, which means that the second direct-current load is powered through the second capacitor, in this case the preset modulation strategy is that: the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off, and thus within the time range in which the conditions that the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value are met, the second capacitor can be charged, such that the voltage of the second capacitor remains stable, and the three phase currents of the three-phase alternating-current power supply can be balanced, thus avoiding a harmonic of certain one phase current from being significantly large and effectively reducing the harmonic.

In the three-phase power supply conversion circuit above, the first voltage value is a target voltage setting value of the first capacitor or a measured voltage value of the first capacitor.

The first voltage value is set to be the target voltage setting value or the measured voltage value of the first capacitor, which means that the difference value between the maximum phase voltage and the intermediate phase voltage of the three-phase alternating-current power supply is smaller than the target voltage setting value or the measured voltage value of the first capacitor, in this case the bidirectional switch corresponding to the intermediate phase voltage of the three-phase alternating-current power supply is turned on to connect the intermediate phase voltage to one end of the first capacitor, and the maximum phase voltage of the three-phase alternating-current power supply may be connected to the other end of the first capacitor through a diode of a three-phase rectifier bridge, such that the voltage applied to two ends of the first capacitor is just the difference value between the maximum phase voltage and the intermediate phase voltage of the three-phase alternating-current power supply, and the difference value is smaller than the target voltage setting value or the measured voltage value of the first capacitor, which can ensure that an actual voltage at two ends the first capacitor will not exceed the target voltage setting value or the measured voltage value, thus avoiding the first capacitor from being damaged by an overvoltage.

In the three-phase power supply conversion circuit above, the second voltage value is an upper-limit voltage setting value of the second capacitor or a measured voltage value of the second capacitor.

The second voltage value is set to be the upper-limit voltage setting value or the measured voltage value of the second capacitor, which means that the difference value between the intermediate phase voltage and the minimum phase voltage of the three-phase alternating-current power supply is smaller than the upper-limit voltage setting value or the measured voltage value of the second capacitor, in this case the bidirectional switch corresponding to the intermediate phase voltage of the three-phase alternating-current power supply is turned on to connect the intermediate phase voltage to one end of the second capacitor, and the minimum phase voltage of the three-phase alternating-current power supply may be connected to the other end of the second capacitor through a diode of a three-phase rectifier bridge, such that the voltage applied to two ends of the second capacitor is just the difference value between the intermediate phase voltage and the minimum phase voltage of the three-phase alternating-current power supply, and the difference value is smaller than the upper-limit voltage setting value or the measured voltage value of the second capacitor, which can ensure that an actual voltage at two ends the second capacitor will not exceed the upper-limit voltage setting value or the measured voltage value, thus avoiding the second capacitor from being damaged by an overvoltage.

In the three-phase power supply conversion circuit above, each of the first bidirectional switch, the second bidirectional switch and the third bidirectional switch includes two power switch transistors reversely connected in parallel to each other.

The bidirectional switch including two power switch transistors reversely connected in parallel to each other is used as a fully controlled bidirectional conducting power switch, which can realize bidirectional conduction through a control signal and can also realize bidirectional blocking through a control signal. Specifically, the bidirectional conduction is realized by controlling the two power switch transistors to be turned on at the same time, and the bidirectional blocking is realized by controlling the two power switch transistors to be turned off at the same time.

In the three-phase power supply conversion circuit above, each of the first bidirectional switch, the second bidirectional switch and the third bidirectional switch includes two power switch transistors reversely connected in series to each other, and each of the two power switch transistors is reversely connected in parallel to a diode.

The bidirectional switch including two power switch transistors reversely connected in series to each other and reversely connected in parallel to the diode is used as a fully controlled bidirectional conducting power switch, which can realize bidirectional conduction through a control signal and can also realize bidirectional blocking through a control signal. Specifically, the bidirectional conduction is realized by controlling the two power switch transistors to be turned on at the same time, and the bidirectional blocking is realized by controlling the two power switch transistors to be turned off at the same time. In addition, the diode may be a fast recovery diode.

In the three-phase power supply conversion circuit above, each of the first bidirectional switch, the second bidirectional switch and the third bidirectional switch includes a fourth bridge arm, a fifth bridge arm and a sixth bridge arm which are connected in parallel to each other, the fourth bridge arm and the sixth bridge arm each include two diodes connected in series to each other, and the fifth bridge arm includes a power switch transistor.

In a second aspect, an embodiment of the present disclosure provides a circuit control method applied to a three-phase power supply conversion circuit, where the three-phase power supply conversion circuit includes a rectifier module, an energy storage module and a direct-current load module, the rectifier module includes a three-phase rectifier bridge and a bidirectional switch assembly, and the three-phase rectifier bridge includes a first bridge arm, a second bridge arm and a third bridge arm which are connected in parallel to each other; the bidirectional switch assembly includes a first bidirectional switch, a second bidirectional switch and a third bidirectional switch, one end of the first bidirectional switch is connected to a midpoint of the first bridge arm, one end of the second bidirectional switch is connected to a midpoint of the second bridge arm, and one end of the third bidirectional switch is connected to a midpoint of the third bridge arm; the energy storage module is connected to a direct-current output end of the rectifier module, the energy storage module includes a first capacitor and a second capacitor which are connected in series to each other, and the other end of the first bidirectional switch, the other end of the second bidirectional switch and the other end of the third bidirectional switch are all connected between the first capacitor and the second capacitor; the direct-current load module includes a first direct-current load connected in parallel to the first capacitor or a second direct-current load connected in parallel to the second capacitor; and the method includes:

controlling the first bidirectional switch, the second bidirectional switch and the third bidirectional switch according to three phase voltages of a three-phase alternating-current power supply, resulting in that a voltage between two ends of the first capacitor or a voltage between two ends of the second capacitor is maintained at a target voltage.

The circuit control method provided by the embodiments of the present disclosure at least has the following beneficial effects: by connecting the first direct-current load in parallel to two ends of the first capacitor or connecting the second direct-current load in parallel to two ends of the second capacitor, and controlling the first bidirectional switch, the second bidirectional switch and the third bidirectional switch according to the three phase voltages of the three-phase alternating-current power supply, the voltage between two ends of the first capacitor or the voltage between two ends of the second capacitor is maintained at the target voltage, such that the voltage between two ends of the first capacitor or the second capacitor remains stable, which means that direct-current loads with a low voltage level such as a direct-current fan and an auxiliary power supply may be powered through the first capacitor or the second capacitor, and three phase currents of the three-phase alternating-current power supply can be balanced, thus avoiding a harmonic of certain one phase current from being significantly large and effectively reducing the harmonic.

In the circuit control method above, the controlling the first bidirectional switch, the second bidirectional switch and the third bidirectional switch according to the three phase voltages of the three-phase alternating-current power supply, includes:

when a difference value between a maximum phase voltage and an intermediate phase voltage of the three-phase alternating-current power supply is smaller than a first voltage value, and a difference value between the intermediate phase voltage and a minimum phase voltage of the three-phase alternating-current power supply is smaller than a second voltage value, controlling on-off of the bidirectional switch assembly with a preset modulation strategy;

where the preset modulation strategy is that: a bidirectional switch corresponding to the intermediate phase voltage of the three-phase alternating-current power supply is kept on, a bidirectional switch corresponding to one phase voltage except for the intermediate phase voltage in the three-phase alternating-current power supply is kept off, and a bidirectional switch corresponding to the other phase voltage except for the intermediate phase voltage in the three-phase alternating-current power supply is alternately turned on and the on-off of the bidirectional switch assembly is controlled through the preset modulation strategy within a time range in which the following conditions are met: the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value. The first capacitor or the second capacitor is charged within the time range, such that the voltage between two ends of the first capacitor or the second capacitor remains stable, then the direct-current loads with the low voltage level such as the direct-current fan and the auxiliary power supply may be powered through the first capacitor or the second capacitor, and the three phase currents of the three-phase alternating-current power supply can be balanced, thus avoiding a harmonic of certain one phase current from being significantly large and effectively reducing the harmonic.

In the circuit control method above, the direct-current load module includes the first direct-current load connected in parallel to the first capacitor, and the preset modulation strategy is specifically that:

the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off.

When the first direct-current load is connected in parallel to two ends of the first capacitor, which means that the first direct-current load is powered through the first capacitor, in this case the preset modulation strategy is that: the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off, and thus within the time range in which the conditions that the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value are met, the first capacitor can be charged, such that the voltage of the first capacitor remains stable, and the three phase currents of the three-phase alternating-current power supply can be balanced, thus avoiding a harmonic of certain one phase current from being significantly large and effectively reducing the harmonic.

In the circuit control method above, the direct-current load module includes the second direct-current load connected in parallel to the second capacitor, and the preset modulation strategy is specifically that:

the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off.

When the second direct-current load is connected in parallel to two ends of the second capacitor, which means that the second direct-current load is powered through the second capacitor, in this case the preset modulation strategy is that: the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off, and thus within the time range in which the conditions that the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value are met, the second capacitor can be charged, such that the voltage of the second capacitor remains stable, and the three phase currents of the three-phase alternating-current power supply can be balanced, thus avoiding a harmonic of certain one phase current from being significantly large and effectively reducing the harmonic.

In the circuit control method above, the first voltage value is a target voltage setting value of the first capacitor or a measured voltage value of the first capacitor.

The first voltage value is set to be the target voltage setting value or the measured voltage value of the first capacitor, which means that the difference value between the maximum phase voltage and the intermediate phase voltage of the three-phase alternating-current power supply is smaller than the target voltage setting value or the measured voltage value of the first capacitor, in this case the bidirectional switch corresponding to the intermediate phase voltage of the three-phase alternating-current power supply is turned on to connect the intermediate phase voltage to one end of the first capacitor, and the maximum phase voltage of the three-phase alternating-current power supply may be connected to the other end of the first capacitor through a diode of a three-phase rectifier bridge, such that the voltage applied to two ends of the first capacitor is just the difference value between the maximum phase voltage and the intermediate phase voltage of the three-phase alternating-current power supply, and the difference value is smaller than the target voltage setting value or the measured voltage value of the first capacitor, which can ensure that an actual voltage at two ends the first capacitor will not exceed the target voltage setting value or the measured voltage value, thus avoiding the first capacitor from being damaged by an overvoltage.

In the circuit control method above, the second voltage value is an upper-limit voltage setting value of the second capacitor or a measured voltage value of the second capacitor.

The second voltage value is set to be the upper-limit voltage setting value or the measured voltage value of the second capacitor, which means that the difference value between the intermediate phase voltage and the minimum phase voltage of the three-phase alternating-current power supply is smaller than the upper-limit voltage setting value or the measured voltage value of the second capacitor, in this case the bidirectional switch corresponding to the intermediate phase voltage of the three-phase alternating-current power supply is turned on to connect the intermediate phase voltage to one end of the second capacitor, and the minimum phase voltage of the three-phase alternating-current power supply may be connected to the other end of the second capacitor through a diode of a three-phase rectifier bridge, such that the voltage applied to two ends of the second capacitor is just the difference value between the intermediate phase voltage and the minimum phase voltage of the three-phase alternating-current power supply, and the difference value is smaller than the upper-limit voltage setting value or the measured voltage value of the second capacitor, which can ensure that an actual voltage at two ends the second capacitor will not exceed the upper-limit voltage setting value or the measured voltage value, thus avoiding the second capacitor from being damaged by an overvoltage.

In a third aspect, an embodiment of the present disclosure provides a circuit board, which includes the three-phase power supply conversion circuit according to the embodiment in the first aspect of the present disclosure.

The circuit board provided by the embodiments of the present disclosure has at least the following beneficial effects: by connecting the first direct-current load in parallel to two ends of the first capacitor or connecting the second direct-current load in parallel to two ends of the second capacitor, and controlling the first bidirectional switch, the second bidirectional switch and the third bidirectional switch according to the three phase voltages of the three-phase alternating-current power supply, the voltage between two ends of the first capacitor or the voltage between two ends of the second capacitor is maintained at the target voltage, such that the voltage between two ends of the first capacitor or the second capacitor remains stable, which means that direct-current loads with a low voltage level such as a direct-current fan and an auxiliary power supply may be powered through the first capacitor or the second capacitor, and three phase currents of the three-phase alternating-current power supply can be balanced, thus avoiding a harmonic of certain one phase current from being significantly large and effectively reducing the harmonic.

In a fourth aspect, an embodiment of the present disclosure provides an operation control device, which includes at least one processor and a storage used for communicating with the at least one processor, where the storage stores an instruction executable by the at least one processor, and the instruction is executed by the at least one processor, such that the at least one processor is capable of executing the circuit control method according to the embodiment in the second aspect of the present disclosure.

The operation control device provided by the embodiments of the present disclosure has at least the following beneficial effects: by connecting the first direct-current load in parallel to two ends of the first capacitor or connecting the second direct-current load in parallel to two ends of the second capacitor, and controlling the first bidirectional switch, the second bidirectional switch and the third bidirectional switch according to the three phase voltages of the three-phase alternating-current power supply, the voltage between two ends of the first capacitor or the voltage between two ends of the second capacitor is maintained at the target voltage, such that the voltage between two ends of the first capacitor or the second capacitor remains stable, which means that direct-current loads with a low voltage level such as a direct-current fan and an auxiliary power supply may be powered through the first capacitor or the second capacitor, and three phase currents of the three-phase alternating-current power supply can be balanced, thus avoiding a harmonic of certain one phase current from being significantly large and effectively reducing the harmonic.

In a fifth aspect, an embodiment of the present disclosure provides an air conditioner, which includes the circuit board according to the embodiment in the third aspect of the present disclosure or the operation control device according to the embodiment in the fourth aspect of the present disclosure.

The air conditioner provided by the embodiments of the present disclosure has at least the following beneficial effects: by connecting the first direct-current load in parallel to two ends of the first capacitor or connecting the second direct-current load in parallel to two ends of the second capacitor, and controlling the first bidirectional switch, the second bidirectional switch and the third bidirectional switch according to the three phase voltages of the three-phase alternating-current power supply, the voltage between two ends of the first capacitor or the voltage between two ends of the second capacitor is maintained at the target voltage, such that the voltage between two ends of the first capacitor or the second capacitor remains stable, which means that direct-current loads with a low voltage level such as a direct-current fan and an auxiliary power supply may be powered through the first capacitor or the second capacitor, and three phase currents of the three-phase alternating-current power supply can be balanced, thus avoiding a harmonic of certain one phase current from being significantly large and effectively reducing the harmonic.

In a sixth aspect, an embodiment of the present disclosure provides a computer-readable storage medium, where the computer-readable storage medium stores a computer-executable instruction, and the computer-executable instruction is used for enabling a computer to execute the circuit control method according to the embodiment in the second aspect of the present disclosure.

The computer-readable storage medium provided by the embodiments of the present disclosure has at least the following beneficial effects: by connecting the first direct-current load in parallel to two ends of the first capacitor or connecting the second direct-current load in parallel to two ends of the second capacitor, and controlling the first bidirectional switch, the second bidirectional switch and the third bidirectional switch according to the three phase voltages of the three-phase alternating-current power supply, the voltage between two ends of the first capacitor or the voltage between two ends of the second capacitor is maintained at the target voltage, such that the voltage between two ends of the first capacitor or the second capacitor remains stable, which means that direct-current loads with a low voltage level such as a direct-current fan and an auxiliary power supply may be powered through the first capacitor or the second capacitor, and three phase currents of the three-phase alternating-current power supply can be balanced, thus avoiding a harmonic of certain one phase current from being significantly large and effectively reducing the harmonic. Other features and advantages of the present disclosure will be stated in the following specification, and are partially obvious from the specification, or are learned by implementing the present disclosure. The objectives and other advantages of the present disclosure can be implemented and obtained by the structure particularly pointed out in the specification, the claims and the accompanying drawings.

BRIEF DESCRIPTION OF DRAWINGS

The accompanying drawings are provided to further understand the technical solutions of the present disclosure and constitute a part of the specification, and the accompanying drawings are used together with the embodiments of the present disclosure to explain the technical solutions of the present disclosure, but do not constitute a limitation to the technical solutions of the present disclosure.

DETAILED DESCRIPTION

To make the objectives, technical scheme, and the advantages of the present disclosure more clear, the present disclosure is further described in detail hereinafter with reference to the accompanying drawings and the embodiments. It should be understood that the specific embodiments described herein are only used for explaining the present disclosure, and are not intended to limit the present disclosure.

It should be noted that although the functional module division is performed in the schematic diagram of the device and the logical sequence is shown in the flow chart, the steps shown or described can be executed by the module division different from that in schematic diagram of the device or the sequence different from that in the flow chart in some cases. The terms "first", "second", etc. in the specification, the claims, and the accompanying drawings are used to distinguish similar objects, and are not necessarily used to describe a specific order or sequence.

The present disclosure provides a three-phase power supply conversion circuit, a circuit control method, a circuit board, and an air conditioner capable of providing a stable voltage, balancing three phase currents and effectively reducing a harmonic.

The embodiments of the present disclosure are further described hereinafter with reference to the accompanying drawings.

Figure 1:
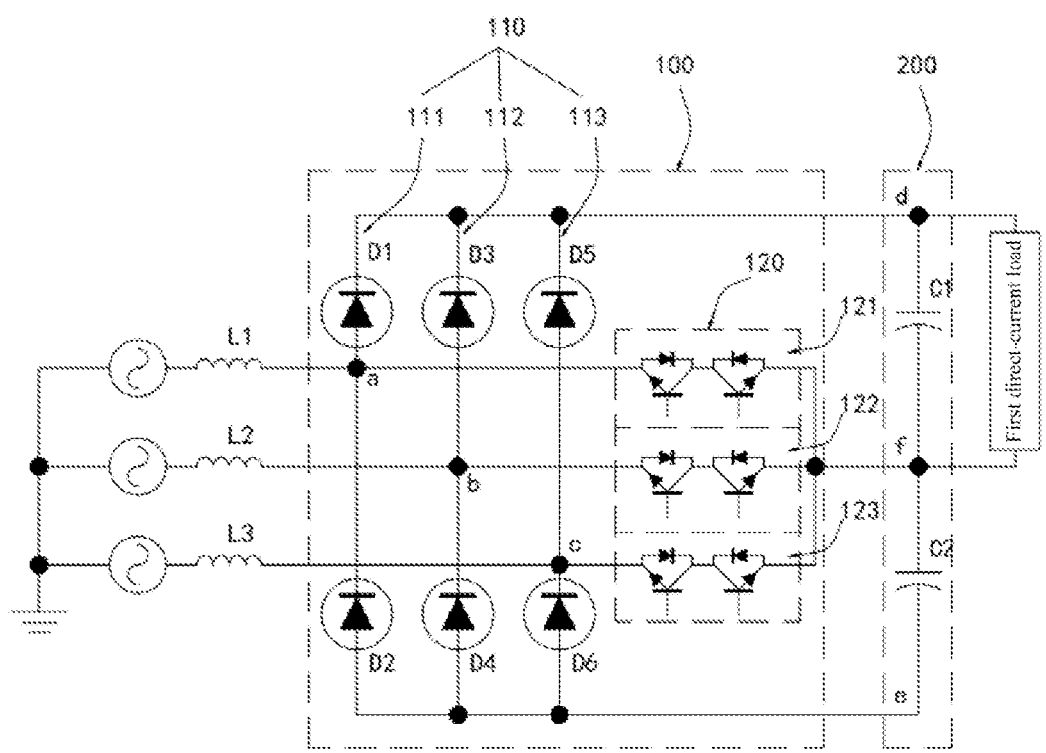
FIG. 1 is a schematic circuit diagram of a three-phase power supply conversion circuit provided by one embodiment of the present disclosure.
Figure 2:
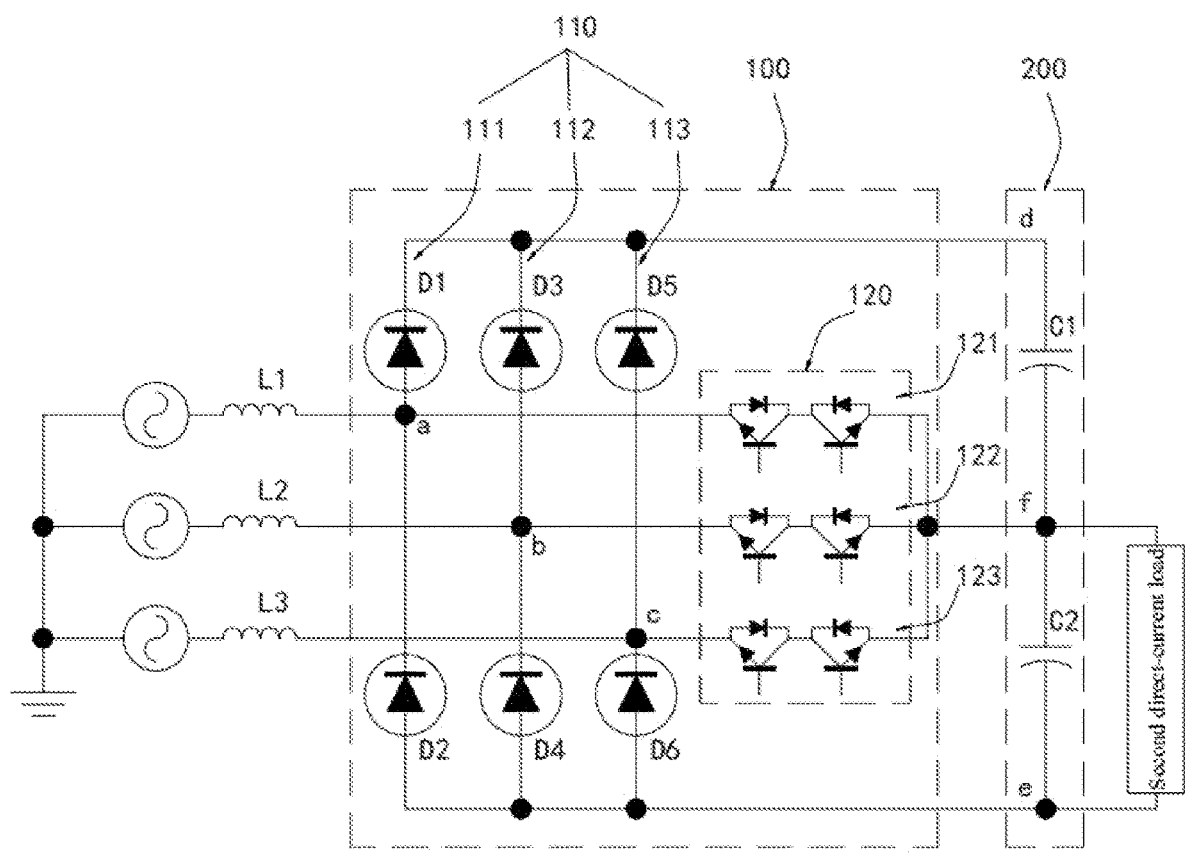
FIG. 2 is a schematic circuit diagram of a three-phase power supply conversion circuit provided by another embodiment of the present disclosure.

With reference to FIG. 1 and FIG. 2, an embodiment in a first aspect of the present disclosure provides a three-phase power supply conversion circuit, which includes a rectifier module 100, an energy storage module 200, a control module and a direct-current load module. The control module is not shown in FIG. 1 and FIG. 2, which does not affect the understanding of the embodiment.

The rectifier module 100 includes a three-phase rectifier bridge 110 and a bidirectional switch assembly 120, and the three-phase rectifier bridge 110 includes a first bridge arm 111, a second bridge arm 112 and a third bridge arm 113 which are connected in parallel to each other. The first bridge arm 111 includes a first diode D1 and a second diode D2 connected in series to each other, the second bridge arm 112 includes a third diode D3 and a fourth diode D4 connected in series to each other, and the third bridge arm 113 includes a fifth diode D5 and a sixth diode D6 connected in series to each other. It can be understood that each of the first bridge arm 111, the second bridge arm 112 and the third bridge arm 113 may also be implemented by two switch transistors connected in series to each other besides implemented by two diodes connected in series to each other. The bidirectional switch assembly 120 includes a first bidirectional switch 121, a second bidirectional switch 122 and a third bidirectional switch 123, one end of the first bidirectional switch 121 is connected to a midpoint of the first bridge arm 111, which is namely a connecting point a between the first diode D1 and the second diode D2, one end of the second bidirectional switch 122 is connected to a midpoint of the second bridge arm 112, which is namely a connecting point b between the third diode D3 and the fourth diode D4, and one end of the third bidirectional switch 123 is connected to a midpoint of the third bridge arm 113, which is namely a connecting point c between the fifth diode D5 and the sixth diode D6.

The energy storage module 200 is connected to a direct-current output end of the rectifier module 100, the energy storage module 200 includes a first capacitor C1 and a second capacitor C2 which are connected in series to each other, and the other end of the first bidirectional switch 121, the other end of the second bidirectional switch 122 and the other end of the third bidirectional switch 123 are all connected between the first capacitor C1 and the second capacitor C2. Specifically, the direct-current output end of the rectifier module 100 includes a positive bus end d and a negative bus end e, one end of the first capacitor C1 is connected to the positive bus end d, one end of the second capacitor C2 is connected to the negative bus end e, and the other end of the first capacitor C1 and the other end of the second capacitor C2 are connected together. A connecting point between the first capacitor C1 and the second capacitor C2 is a midpoint f of a direct-current bus, and the other end of the first bidirectional switch 121, the other end of the second bidirectional switch 122 and the other end of the third bidirectional switch 123 are all connected to the midpoint f of the direct-current bus.

In addition, the three-phase alternating-current power supply includes an A-phase voltage, a B-phase voltage and a C-phase voltage. The A-phase voltage is connected to the connection point a between the first diode D1 and the second diode D2 through a first inductor L1, the B-phase voltage is connected to the connecting point b between the third diode D3 and the fourth diode D4 through a second inductor L2, and the C-phase voltage is connected to the connecting point c between the fifth diode D5 and the sixth diode D6 through a third inductor L3.

The direct-current load module includes a first direct-current load connected in parallel to the first capacitor C1 or a second direct-current load connected in parallel to the second capacitor C2.

The control module is connected to the bidirectional switch assembly 120, which means that the control module is connected to the first bidirectional switch 121, the second bidirectional switch 122 and the third bidirectional switch 123 respectively, and the control module is used for controlling the first bidirectional switch 121, the second bidirectional switch 122 and the third bidirectional switch 123 according to the three phase voltages of the three-phase alternating-current power supply, such that a voltage between two ends of the first capacitor C1 or a voltage between two ends of the second capacitor C2 is maintained at a target voltage.

According to the three-phase power supply conversion circuit provided by the embodiments of the present disclosure, by connecting the first direct-current load in parallel to two ends of the first capacitor C1 or connecting the second direct-current load in parallel to two ends of the second capacitor C2, and controlling the first bidirectional switch 121, the second bidirectional switch 122 and the third bidirectional switch 123 according to the three phase voltages of the three-phase alternating-current power supply, the voltage between two ends of the first capacitor C1 or the voltage between two ends of the second capacitor C2 is maintained at the target voltage, such that the voltage between two ends of the first capacitor C1 or the second capacitor C2 remains stable, which means that direct-current loads with a low voltage level such as a direct-current fan and an auxiliary power supply may be powered through the first capacitor C1 or the second capacitor C2, and three phase currents of the three-phase alternating-current power supply can be balanced, thus avoiding a harmonic of certain one phase current from being significantly large and effectively reducing the harmonic.

Specifically, in the three-phase power supply conversion circuit above, the controlling the first bidirectional switch 121, the second bidirectional switch 122 and the third bidirectional switch 123 according to the three phase voltages of the three-phase alternating-current power supply, includes:

when a difference value between a maximum phase voltage and an intermediate phase voltage of the three-phase alternating-current power supply is smaller than a first voltage value, and a difference value between the intermediate phase voltage and a minimum phase voltage of the three-phase alternating-current power supply is smaller than a second voltage value, controlling on-off of the bidirectional switch assembly 120 with a preset modulation strategy by the control module.

The preset modulation strategy is that: a bidirectional switch corresponding to the intermediate phase voltage of the three-phase alternating-current power supply is kept on, a bidirectional switch corresponding to one phase voltage except for the intermediate phase voltage in the three-phase alternating-current power supply is kept off, and a bidirectional switch corresponding to the other phase voltage except for the intermediate phase voltage in the three-phase alternating-current power supply is alternately turned on and off.

In addition, it should be noted that the maximum phase voltage, the intermediate phase voltage and the minimum phase voltage of the three-phase alternating-current power supply are determined according to a voltage amplitude at a current moment. For example, at a certain moment or in a certain continuous time period, the maximum phase voltage of the three-phase alternating-current power supply is the A-phase voltage, the intermediate phase voltage of the three-phase alternating-current power supply is the B-phase voltage, and the minimum phase voltage of the three-phase alternating-current power supply is the C-phase voltage; at next moment or next continuous time period, the maximum phase voltage of the three-phase alternating-current power supply is the B-phase voltage, the intermediate phase voltage of the three-phase alternating-current power supply is the A-phase voltage, and the minimum phase voltage of the three-phase alternating-current power supply is the C-phase voltage; and at a moment after next or a continuous time period after next, the maximum phase voltage of the three-phase alternating-current power supply is the B-phase voltage, the intermediate phase voltage of the three-phase alternating-current power supply is the C-phase voltage, and the minimum phase voltage of the three-phase alternating-current power supply is the A-phase voltage. Other cases can be deduced in the same way.

According to the three-phase power supply conversion circuit provided by the embodiments of the present disclosure, the on-off of the bidirectional switch assembly 120 is controlled through the preset modulation strategy within a time range in which the following conditions are met: the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value. The first capacitor C1 or the second capacitor C2 is charged within the time range, such that the voltage between two ends of the first capacitor C1 or the second capacitor C2 remains stable, then the direct-current loads with the low voltage level such as the direct-current fan and the auxiliary power supply may be powered through the first capacitor C1 or the second capacitor C2, and the three phase currents of the three-phase alternating-current power supply can be balanced, thus avoiding a harmonic of certain one phase current from being significantly large and effectively reducing the harmonic.

With reference to FIG. 1, in the three-phase power supply conversion circuit above, the direct-current load module includes the first direct-current load connected in parallel to the first capacitor C1, and the preset modulation strategy is specifically that:

the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off.

Figure 3:
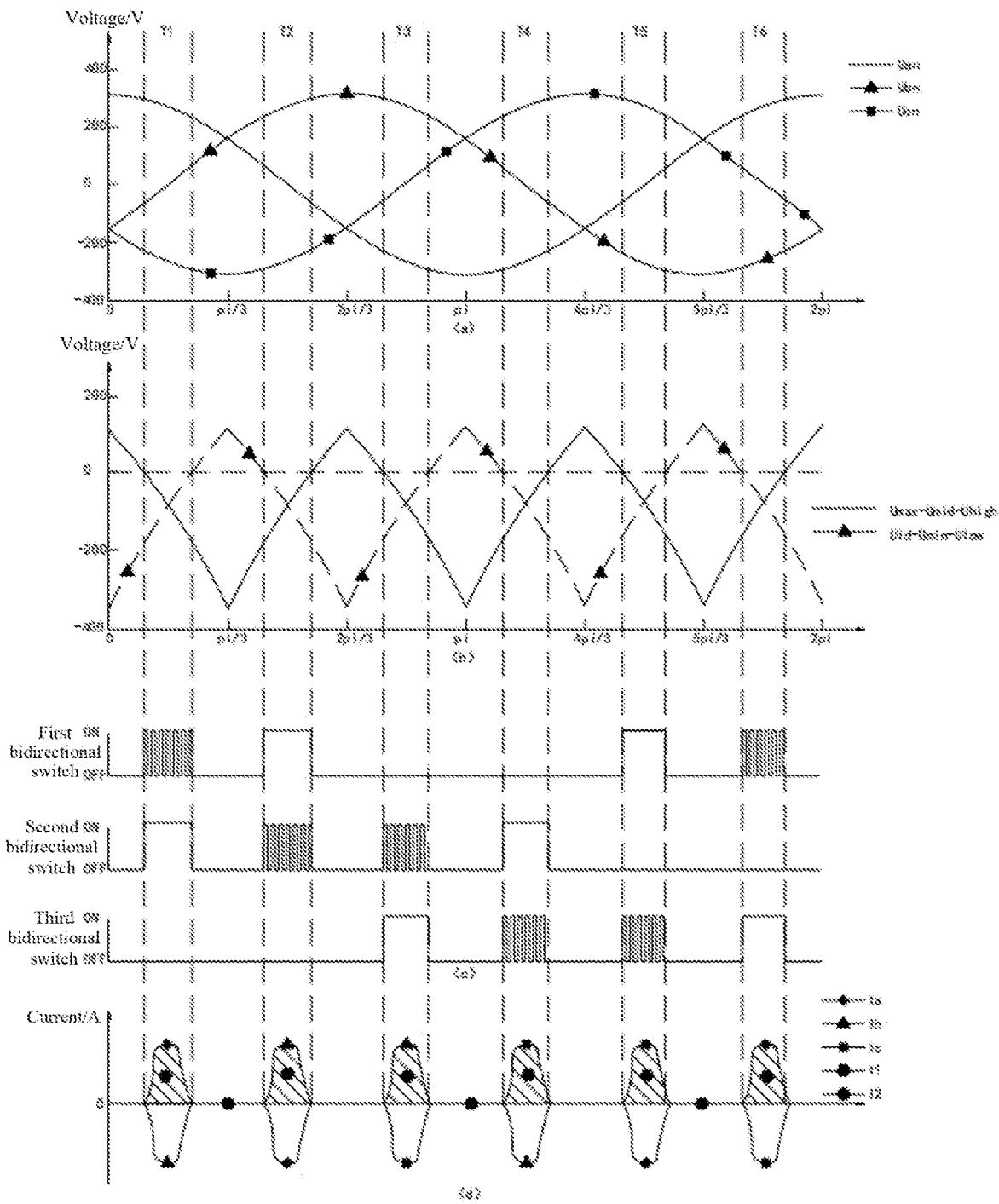
FIG. 3 is a schematic diagram showing a preset modulation strategy of the three-phase power supply conversion circuit provided by one embodiment of the present disclosure.

With reference to FIG. 3, part (a) is an oscillogram of the three-phase alternating-current power supply; part (b) is an oscillogram of a Umax-Umid-Uhigh curve and a Umid-Umin-Ulow curve, where Umax is the maximum phase voltage of the three-phase alternating-current power supply, Umid is the intermediate phase voltage of the three-phase alternating-current power supply, and Umin is the minimum phase voltage of the three-phase alternating-current power supply; Uhigh is the first voltage value, and the first voltage value may be selected as a target voltage setting value of the first capacitor C1; and Ulow is the second voltage value, and the second voltage value may be selected as an upper-limit voltage setting value of the second capacitor C2; part (c) is an oscillogram of control signals of the first bidirectional switch 121, the second bidirectional switch 122 and the third bidirectional switch 123; and part (d) is an oscillogram of an A-phase inductive current Ia, a B-phase inductive current Ib, a C-phase inductive current Ic, a charging current I1 of the first capacitor C1 and a charging current I2 of the second capacitor C2.

It can be seen from the combination of part (a) and part (b) in FIG. 3 that, in one cycle of the three-phase alternating-current power supply, there are 6 time periods in which the conditions that the difference value between the maximum phase voltage Umax and the intermediate phase voltage Umid of the three-phase alternating-current power supply is smaller than the first voltage value Uhigh and the difference value between the intermediate phase voltage Umid and the minimum phase voltage Umin of the three-phase alternating-current power supply is smaller than the second voltage value Ulow are met, the 6 time periods namely include a T1 time period, a T2 time period, a T3 time period, a T4 time period, a T5 time period and a T6 time period. Within the 6 time periods, a control strategy for the bidirectional switch assembly 120 is that: the bidirectional switch corresponding to the minimum phase voltage Umin of the three-phase alternating-current power supply is kept off, the bidirectional switch corresponding to the intermediate phase voltage Umid of the three-phase alternating-current power supply is kept on, and the bidirectional switch corresponding to the maximum phase voltage Umax of the three-phase alternating-current power supply is alternately turned on and off. For example, in combination with part (c) in FIG. 3, within the T1 time period, the maximum phase voltage Umax of the three-phase alternating-current power supply is the A-phase voltage, such that the first bidirectional switch 121 corresponding to the A-phase voltage is alternatively turned on and off, the intermediate phase voltage Umid of the three-phase alternating-current power supply is the B-phase voltage, such that the second bidirectional switch 122 corresponding to the B-phase voltage is kept on, and the minimum phase voltage Umin of the three-phase alternating-current power supply is the C-phase voltage, such that the third bidirectional switch 123 corresponding to the C-phase voltage is kept off. Similarly, within the T2 time period, the maximum phase voltage Umax of the three-phase alternating-current power supply is the B-phase voltage, such that the second bidirectional switch 122 corresponding to the B-phase voltage is alternately turned on and off, the intermediate phase voltage Umid of the three-phase alternating-current power supply is the A-phase voltage, such that the first bidirectional switch 121 corresponding to the A-phase voltage is kept on, and the minimum phase voltage Umin of the three-phase alternating-current power supply is the C-phase voltage, such that the third bidirectional switch 123 corresponding to the C-phase voltage is kept off. Cases in the T3 time period, the T4 time period, the T5 time period and the T6 time period may be deduced in the same way. Correspondingly, under the control strategy, a waveform of each phase current in each time period is that: an inductive current corresponding to the maximum phase voltage Umax of the three-phase alternating-current power supply is increased from zero to a certain value, and is decreased to zero before the end of the time period; and an inductive current corresponding to the intermediate phase voltage Umid and an inductive current corresponding to the maximum phase voltage Umax have the same magnitude and opposite directions. In combination with part (d) in FIG. 3, within the T1 time period, the maximum phase voltage Umax of the three-phase alternating-current power supply is the A-phase voltage, and the corresponding A-phase inductive current Ia is increased from zero to a certain value, and is decreased to zero before the end of the T1 time period; and the intermediate phase voltage Umid of the three-phase alternating-current power supply is the B-phase voltage, and the corresponding B-phase inductive current Ib and A-phase inductive current Ia have the same magnitude and opposite directions. Within the T2 time period, the maximum phase voltage Umax of the three-phase alternating-current power supply is the B-phase voltage, and the corresponding B-phase inductive current Ib is increased from zero to a certain value, and is decreased to zero before the end of the T2 time period; and the intermediate phase voltage Umid of the three-phase alternating-current power supply is the A-phase voltage, and the corresponding A-phase inductive current Ia and B-phase inductive current Ib have the same magnitude and opposite directions. Cases in the T3 time period, the T4 time period, the T5 time period and the T6 time period may be deduced in the same way.

It should be noted that proportions of the T1 time period, the T2 time period, the T3 time period, the T4 time period, the T5 time period and the T6 time period in one cycle of the three-phase alternating-current power supply can be changed by adjusting the first voltage value Uhigh and the second voltage value Ulow, that is, by adjusting the target voltage setting value of the first capacitor C1 and the upper-limit voltage setting value of the second capacitor C2.

Therefore, when the first direct-current load is connected in parallel to two ends of the first capacitor C1, which means that the first direct-current load is powered through the first capacitor C1, in this case the preset modulation strategy is that: the bidirectional switch corresponding to the minimum phase voltage Umin of the three-phase alternating-current power supply is kept off, the bidirectional switch corresponding to the intermediate phase voltage Umid of the three-phase alternating-current power supply is kept on, and the bidirectional switch corresponding to the maximum phase voltage Umax of the three-phase alternating-current power supply is alternately turned on and off; and thus within the time range in which the conditions that the difference value between the maximum phase voltage Umax and the intermediate phase voltage Umid of the three-phase alternating-current power supply is smaller than the first voltage value Uhigh and the difference value between the intermediate phase voltage Umid and the minimum phase voltage Umin of the three-phase alternating-current power supply is smaller than the second voltage value Ulow are met, the first capacitor C1 can be charged, such that the voltage of the first capacitor C1 remains stable, and the three phase currents of the three-phase alternating-current power supply can be balanced, thus avoiding a harmonic of certain one phase current from being significantly large and effectively reducing the harmonic.

It can be understood that when the three-phase power supply conversion circuit above is applied to an air conditioner, the first direct-current load may be an auxiliary power supply and one or a combination of several of multiple direct-current fans. For example, when the air conditioner is provided with one auxiliary power supply, a direct-current fan 1 and a direct-current fan 2, the first direct-current load may be the auxiliary power supply, the direct-current fan 1, the direct-current fan 2, the auxiliary power supply+the direct-current fan 1, the auxiliary power supply+the direct-current fan 2, the direct-current fan 1+the direct-current fan 2, or the auxiliary power supply+the direct-current fan 1+the direct-current fan 2, which are respectively shown in FIG. 8 to FIG. 15.

With reference to FIG. 2, in the three-phase power supply conversion circuit above, the direct-current load module includes the second direct-current load connected in parallel to the second capacitor C2, and the preset modulation strategy is specifically that:

the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off.

Figure 4:
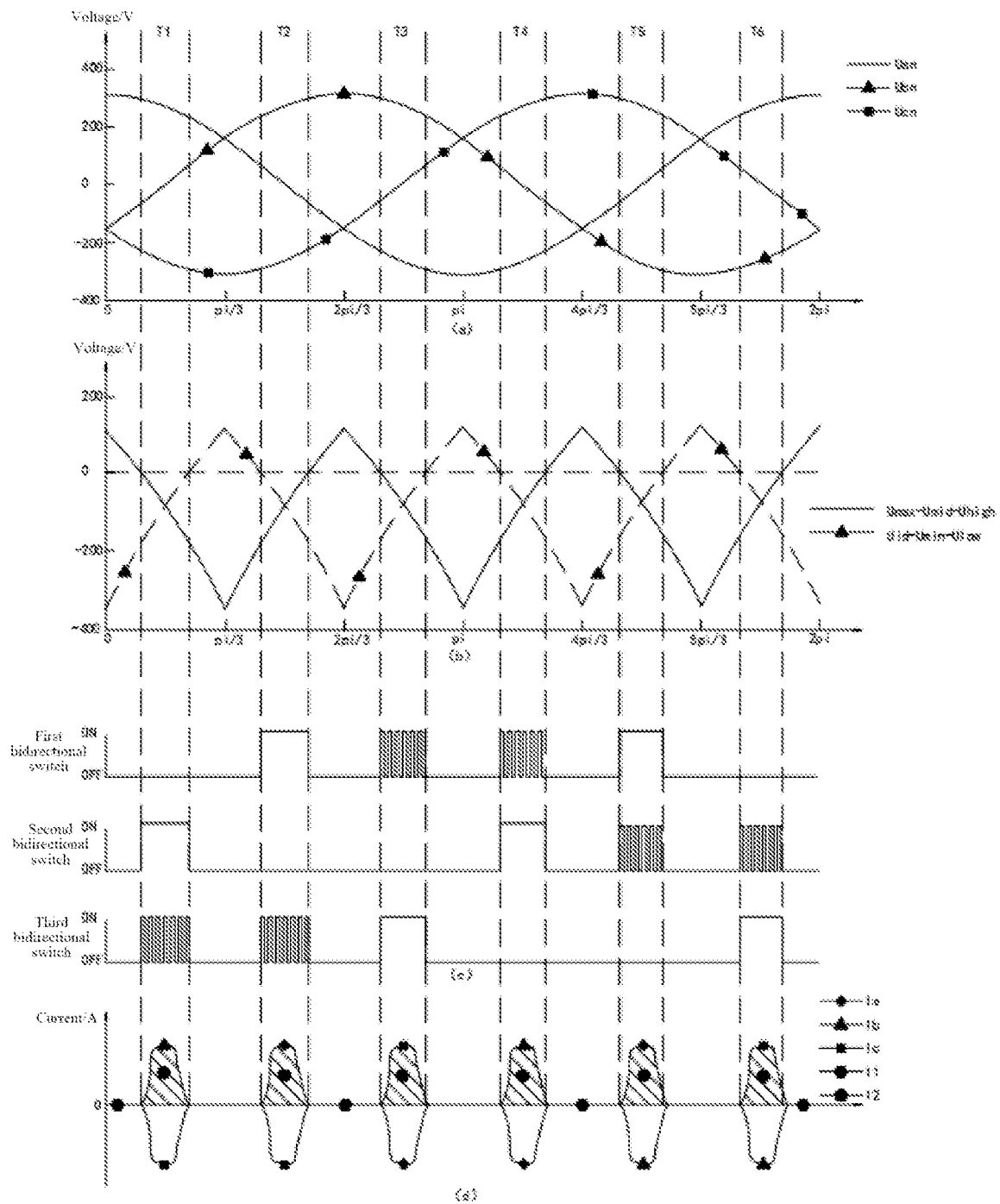
FIG. 4 is a schematic diagram showing a preset modulation strategy of the three-phase power supply conversion circuit provided by another embodiment of the present disclosure.

With reference to FIG. 4, in FIG. 4, part (a) is an oscillogram of the three-phase alternating-current power supply; part (b) is an oscillogram of a Umax-Umid-Uhigh curve and a Umid-Umin-Ulow curve, where Umax is the maximum phase voltage of the three-phase alternating-current power supply, Umid is the intermediate phase voltage of the three-phase alternating-current power supply, and Umin is the minimum phase voltage of the three-phase alternating-current power supply; Uhigh is the first voltage value, and the first voltage value may be selected as a target voltage setting value of the first capacitor C1; and Ulow is the second voltage value, and the second voltage value may be selected as an upper-limit voltage setting value of the second capacitor C2; part (c) is an oscillogram of control signals of the first bidirectional switch 121, the second bidirectional switch 122 and the third bidirectional switch 123; and part (d) is an oscillogram of an A-phase inductive current Ia, a B-phase inductive current Ib, a C-phase inductive current Ic, a charging current I1 of the first capacitor C1 and a charging current I2 of the second capacitor C2.

It can be seen from the combination of part (a) and part (b) in FIG. 4 that, in one cycle of the three-phase alternating-current power supply, there are 6 time periods in which the conditions that the difference value between the maximum phase voltage Umax and the intermediate phase voltage Umid of the three-phase alternating-current power supply is smaller than the first voltage value Uhigh and the difference value between the intermediate phase voltage Umid and the minimum phase voltage Umin of the three-phase alternating-current power supply is smaller than the second voltage value Ulow are met, the 6 time periods namely include a T1 time period, a T2 time period, a T3 time period, a T4 time period, a T5 time period and a T6 time period. Within the 6 time periods, a control strategy for the bidirectional switch assembly 120 is that: the bidirectional switch corresponding to the maximum phase voltage Umax of the three-phase alternating-current power supply is kept off, the bidirectional switch corresponding to the intermediate phase voltage Umid of the three-phase alternating-current power supply is kept on, and the bidirectional switch corresponding to the minimum phase voltage Umin of the three-phase alternating-current power supply is alternately turned on and off. For example, in combination with part (c) in FIG. 4, within the T 1 time period, the maximum phase voltage Umax of the three-phase alternating-current power supply is the A-phase voltage, such that the first bidirectional switch 121 corresponding to the A-phase voltage is kept off, the intermediate phase voltage Umid of the three-phase alternating-current power supply is the B-phase voltage, such that the second bidirectional switch 122 corresponding to the B-phase voltage is kept on, and the minimum phase voltage Umin of the three-phase alternating-current power supply is the C-phase voltage, such that the third bidirectional switch 123 corresponding to the C-phase voltage is alternately turned on and off. Similarly, within the T2 time period, the maximum phase voltage Umax of the three-phase alternating-current power supply is the B-phase voltage, such that the second bidirectional switch 122 corresponding to the B-phase voltage is kept off, the intermediate phase voltage Umid of the three-phase alternating-current power supply is the A-phase voltage, such that the first bidirectional switch 121 corresponding to the A-phase voltage is kept on, and the minimum phase voltage Umin of the three-phase alternating-current power supply is the C-phase voltage, such that the third bidirectional switch 123 corresponding to the C-phase voltage is alternately turned on and off. Cases in the T3 time period, the T4 time period, the T5 time period and the T6 time period may be deduced in the same way. Correspondingly, under the control strategy, a waveform of each phase current in each time period is that: an inductive current corresponding to the intermediate phase voltage Umid of the three-phase alternating-current power supply is increased from zero to a certain value, and is decreased to zero before the end of the time period; and an inductive current corresponding to the minimum phase voltage Umin and an inductive current corresponding to the intermediate phase voltage Umid have the same magnitude and opposite directions. In combination with part (d) in FIG. 4, within the T1 time period, the intermediate phase voltage Umid of the three-phase alternating-current power supply is the B-phase voltage, and the corresponding B-phase inductive current Ib is increased from zero to a certain value, and is decreased to zero before the end of the T1 time period; and the minimum phase voltage Umin of the three-phase alternating-current power supply is the C-phase voltage, and the corresponding C-phase inductive current Ic and B-phase inductive current Ib have the same magnitude and opposite directions. Within the T2 time period, the intermediate phase voltage Umid of the three-phase alternating-current power supply is the A-phase voltage, and the corresponding A-phase inductive current Ia is increased from zero to a certain value, and is decreased to zero before the end of the T2 time period; and the minimum phase voltage Umin of the three-phase alternating-current power supply is the C-phase voltage, and the corresponding C-phase inductive current Ic and A-phase inductive current Ia have the same magnitude and opposite directions. Cases in the T3 time period, the T4 time period, the T5 time period and the T6 time period may be deduced in the same way.

Therefore, when the second direct-current load is connected in parallel to two ends of the second capacitor C2, which means that the second direct-current load is powered through the second capacitor C2, in this case the preset modulation strategy is that: the bidirectional switch corresponding to the maximum phase voltage Umax of the three-phase alternating-current power supply is kept off, the bidirectional switch corresponding to the intermediate phase voltage Umid of the three-phase alternating-current power supply is kept on, and the bidirectional switch corresponding to the minimum phase voltage Umin of the three-phase alternating-current power supply is alternately turned on and off, and thus within the time range in which the conditions that the difference value between the maximum phase voltage Umax and the intermediate phase voltage Umid of the three-phase alternating-current power supply is smaller than the first voltage value Uhigh and the difference value between the intermediate phase voltage Umid and the minimum phase voltage Umin of the three-phase alternating-current power supply is smaller than the second voltage value Ulow are met, the second capacitor C2 can be charged, such that the voltage of the second capacitor C2 remains stable, and the three phase currents of the three-phase alternating-current power supply can be balanced, thus avoiding a harmonic of certain one phase current from being significantly large and effectively reducing the harmonic.

It can be understood that when the three-phase power supply conversion circuit above is applied to an air conditioner, the second direct-current load may be an auxiliary power supply and one or a combination of several of multiple direct-current fans. For example, when the air conditioner is provided with one auxiliary power supply, a direct-current fan 1 and a direct-current fan 2, the second direct-current load may be the auxiliary power supply, the direct-current fan 1, the direct-current fan 2, the auxiliary power supply+the direct-current fan 1, the auxiliary power supply+the direct-current fan 2, the direct-current fan 1+the direct-current fan 2, or the auxiliary power supply+the direct-current fan 1+the direct-current fan 2, which are respectively shown in FIG. 15 to FIG. 21.

Figure 22:
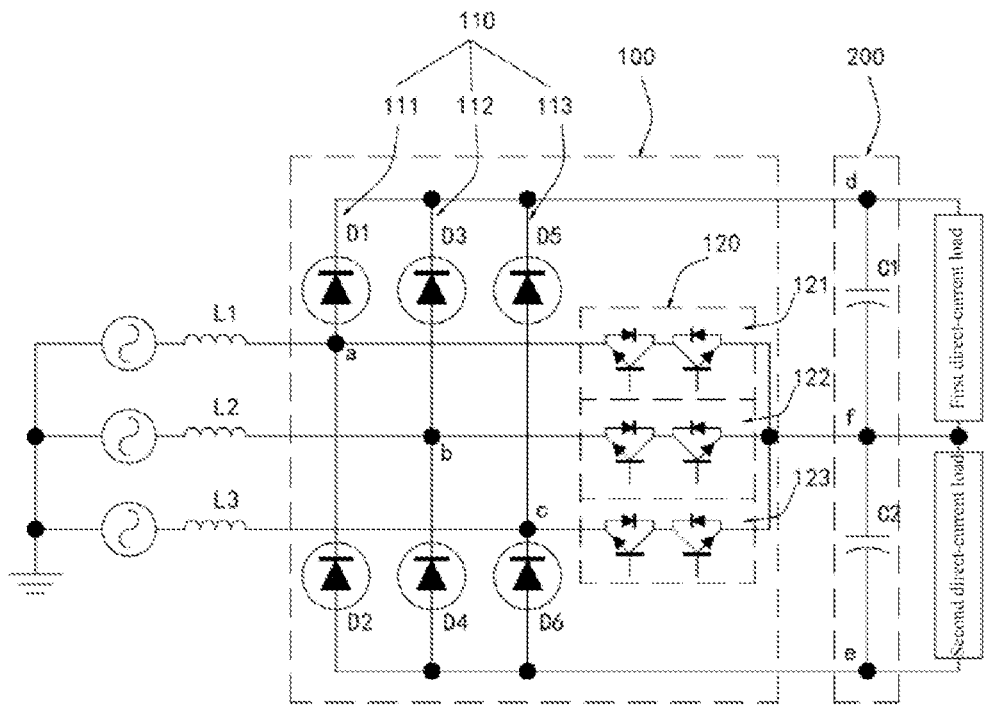
FIG. 22 is a schematic circuit diagram of a three-phase power supply conversion circuit provided by yet another embodiment of the present disclosure.
Figure 23:
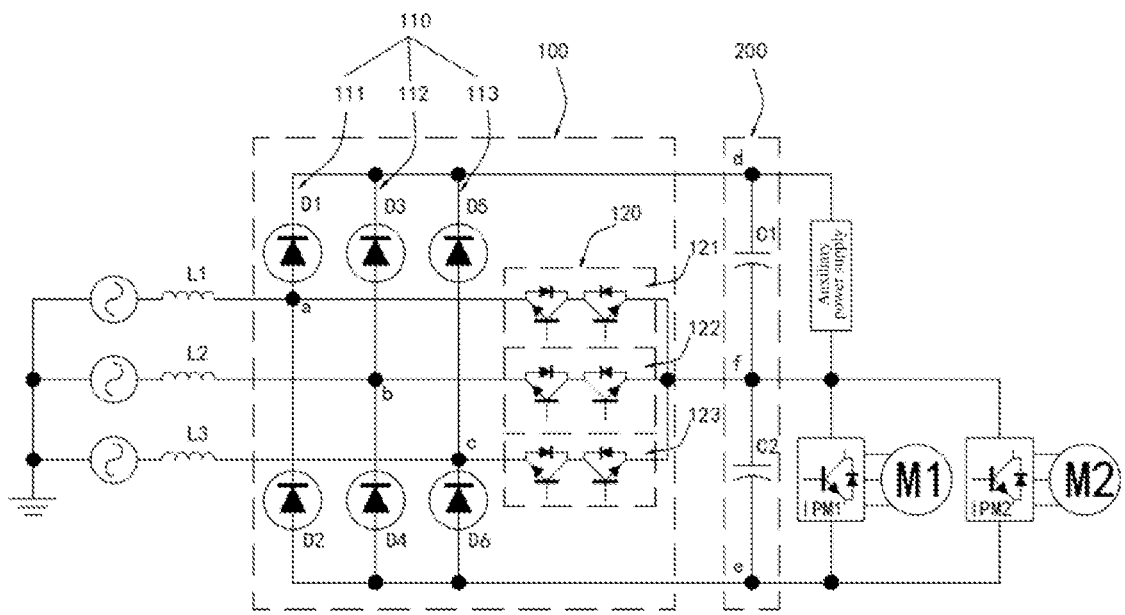
FIG. 23 is a schematic circuit diagram of a first case of the first direct-current load and the second direct-current load in FIG. 22.
Figure 24:
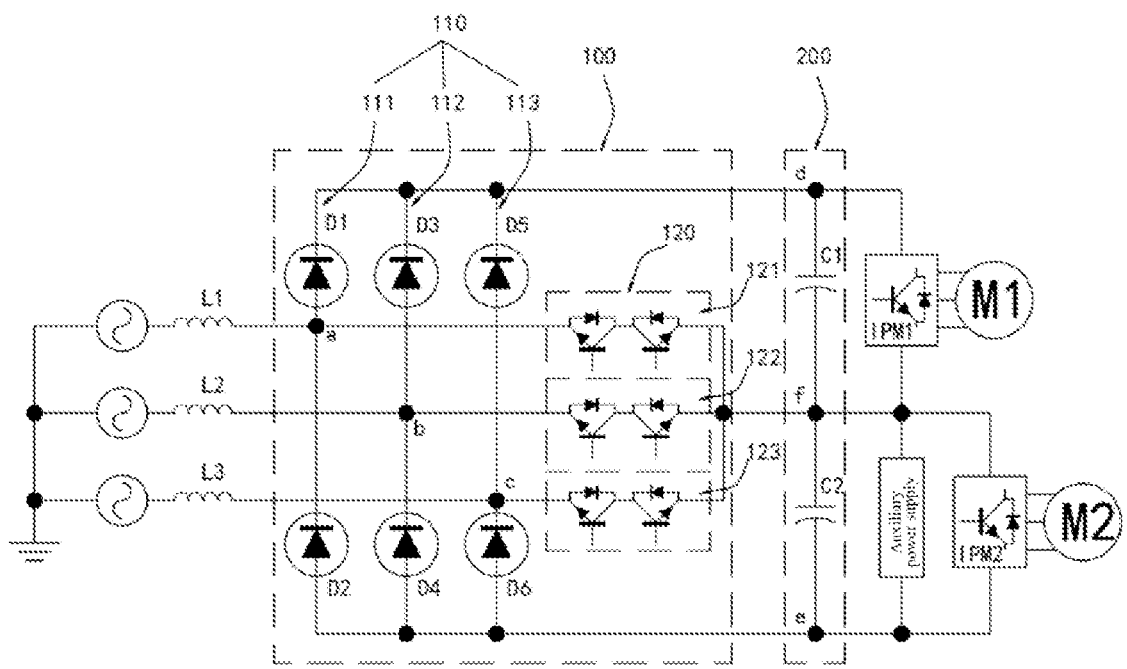
FIG. 24 is a schematic circuit diagram of a second case of the first direct-current load and the second direct-current load in FIG. 22.
Figure 25:
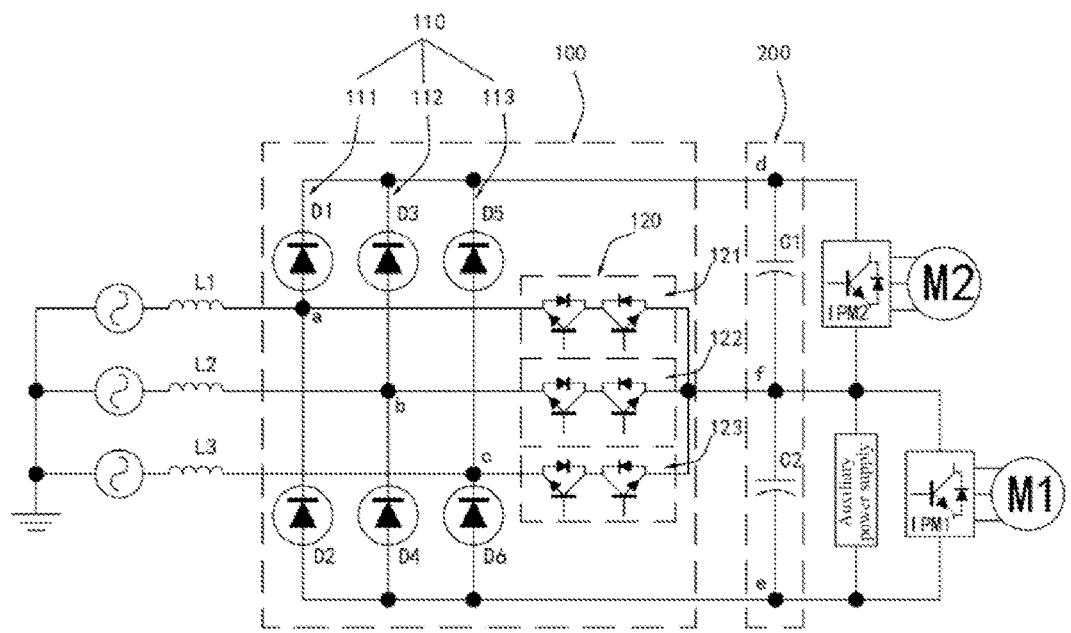
FIG. 25 is a schematic circuit diagram of a third case of the first direct-current load and the second direct-current load in FIG. 22.
Figure 26:
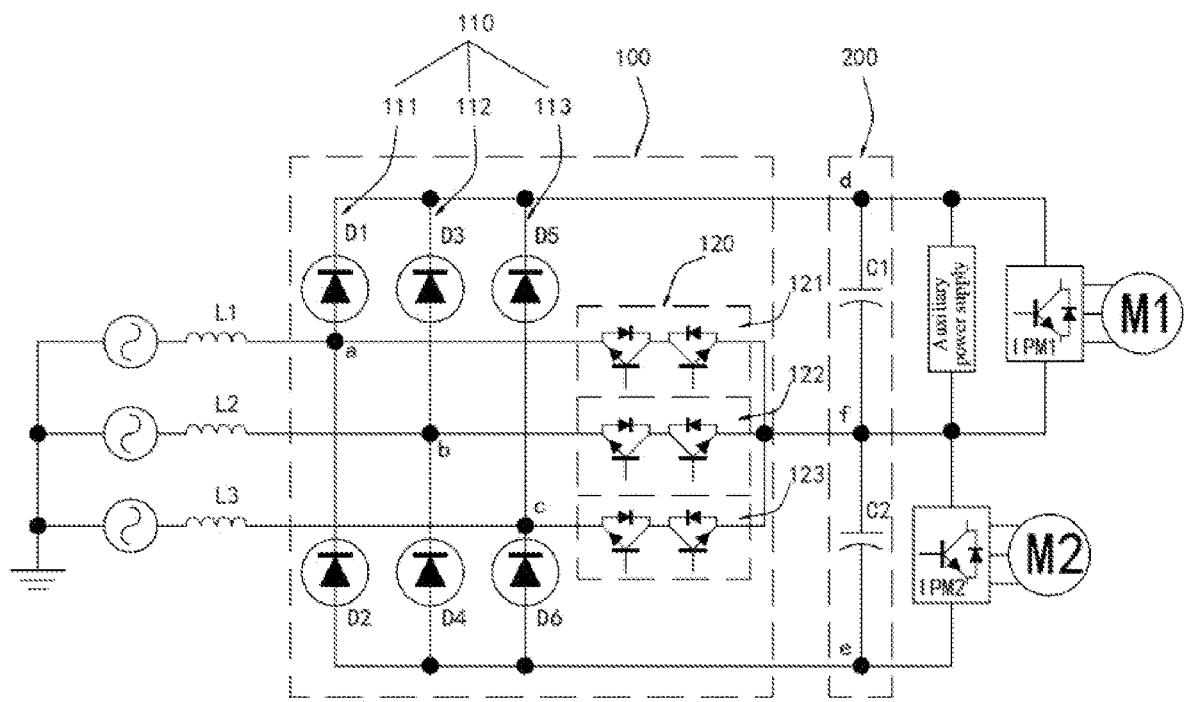
FIG. 26 is a schematic circuit diagram of a fourth case of the first direct-current load and the second direct-current load in FIG. 22.
Figure 27:
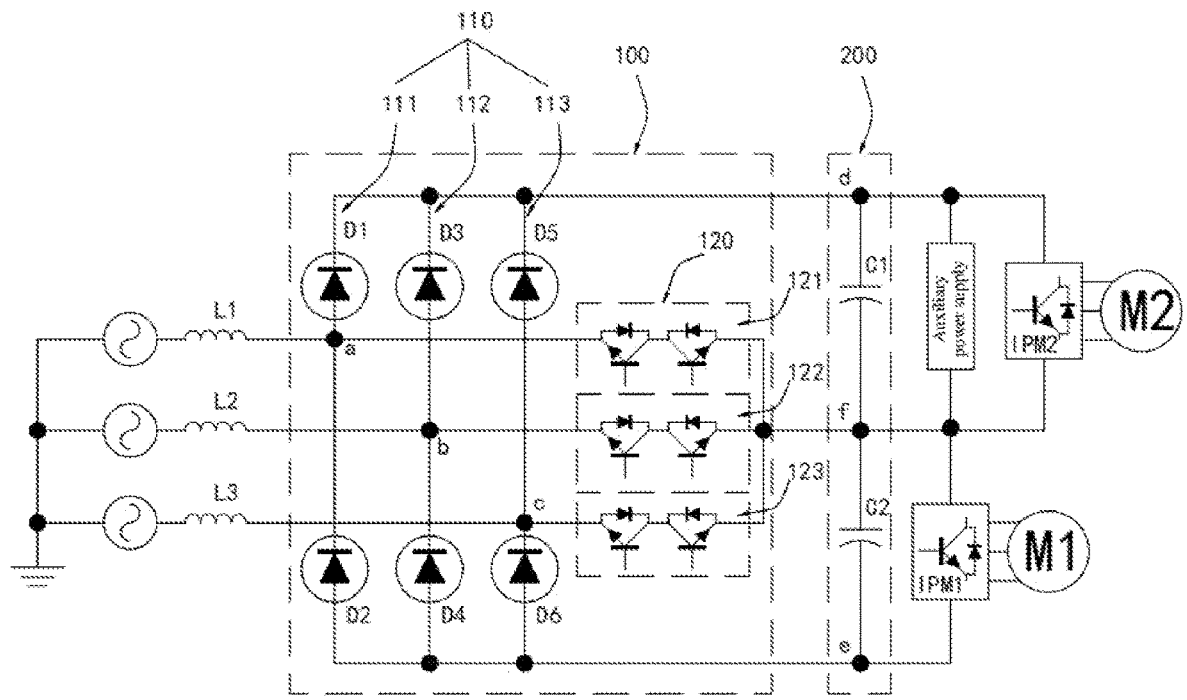
FIG. 27 is a schematic circuit diagram of a fifth case of the first direct-current load and the second direct-current load in FIG. 22.
Figure 28:
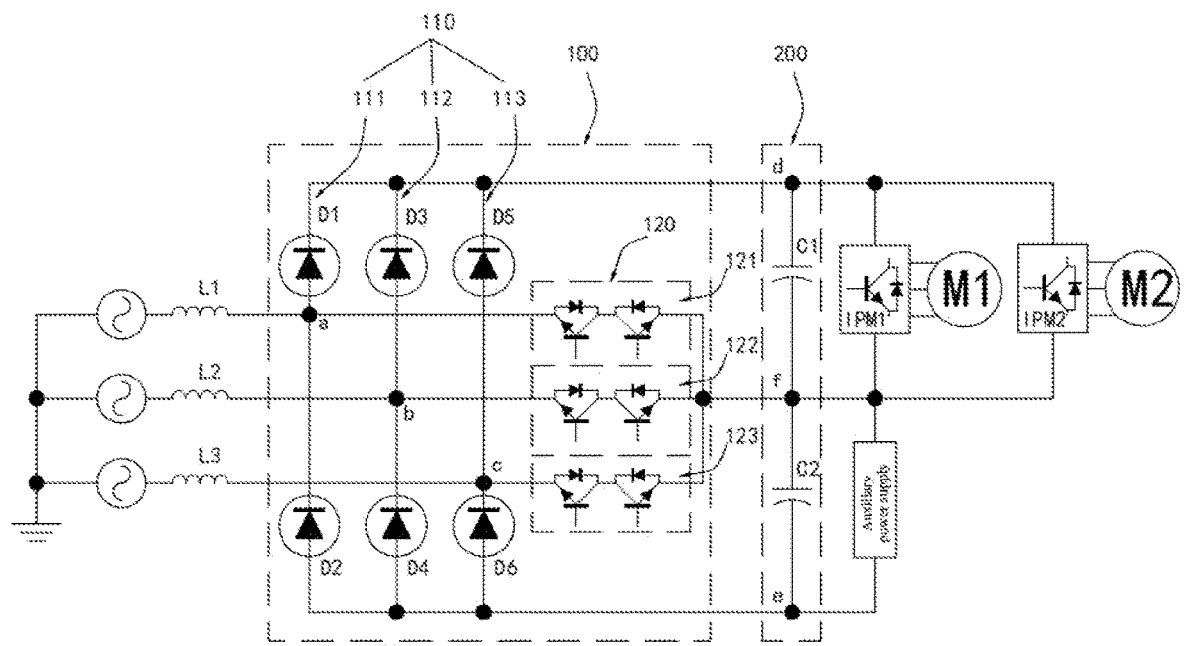
FIG. 28 is a schematic circuit diagram of a sixth case of the first direct-current load and the second direct-current load in FIG. 22.
Figure 29:
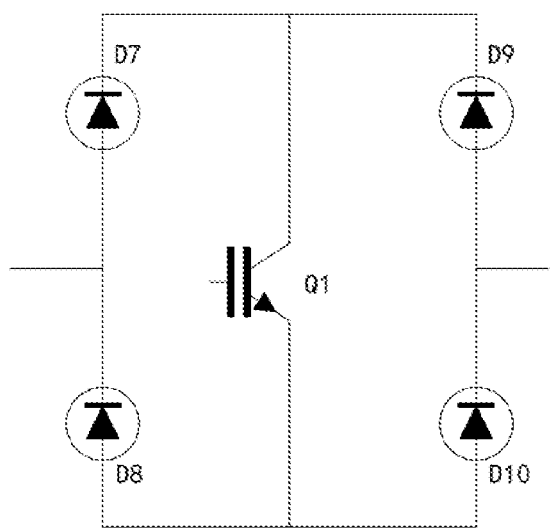
FIG. 29 is a specific structural diagram of a bidirectional switch provided by yet another embodiment of the present disclosure.

With reference to FIG. 22, in the three-phase power supply conversion circuit, the direct-current load module may further include the first direct-current load and the second direct-current load at the same time, the first direct-current load is connected in parallel to the first capacitor C1, and the second direct-current load is connected in parallel to the second capacitor C2. When the air conditioner is provided with one auxiliary power supply, one direct-current fan 1 and one direct-current fan 2, possible combinations of the first direct-current load and the second direct-current load are as follows:

the first direct-current load is the auxiliary power supply, and the second direct-current load is the direct-current fan 1+the direct-current fan 2, as shown in FIG. 23;
the first direct-current load is the direct-current fan 1, and the second direct-current load is the auxiliary power supply+the direct-current fan 2, as shown in FIG. 24;
the first direct-current load is the direct-current fan 2, and the second direct-current load is the auxiliary power supply+the direct-current fan 1, as shown in FIG. 25;
the first direct-current load is the auxiliary power supply+the direct-current fan 1, and the second direct-current load is the direct-current fan 2, as shown in FIG. 26;
the first direct-current load is the auxiliary power supply+the direct-current fan 2, and the second direct-current load is the direct-current fan 1, as shown in FIG. 27; and the first direct-current load is the direct-current fan 1+the direct-current fan 2, and the second direct-current load is the auxiliary power supply, as shown in FIG. 28.

In the three-phase power supply conversion circuit above, the first voltage value is a target voltage setting value of the first capacitor C1 or a measured voltage value of the first capacitor C1.

The first voltage value is set to be the target voltage setting value or the measured voltage value of the first capacitor C1, which means that the difference value between the maximum phase voltage and the intermediate phase voltage of the three-phase alternating-current power supply is smaller than the target voltage setting value or the measured voltage value of the first capacitor C1, in this case the bidirectional switch corresponding to the intermediate phase voltage of the three-phase alternating-current power supply is turned on to connect the intermediate phase voltage to one end of the first capacitor C1, and the maximum phase voltage of the three-phase alternating-current power supply may be connected to the other end of the first capacitor C1 through a diode of a three-phase rectifier bridge 110, such that the voltage applied to two ends of the first capacitor C1 is just the difference value between the maximum phase voltage and the intermediate phase voltage of the three-phase alternating-current power supply, and the difference value is smaller than the target voltage setting value or the measured voltage value of the first capacitor C1, which can ensure that an actual voltage at two ends the first capacitor C1 will not exceed the target voltage setting value or the measured voltage value, thus avoiding the first capacitor C1 from being damaged by an overvoltage.

In the three-phase power supply conversion circuit above, the second voltage value is an upper-limit voltage setting value of the second capacitor C2 or a measured voltage value of the second capacitor C2.

The second voltage value is set to be the upper-limit voltage setting value or the measured voltage value of the second capacitor C2, which means that the difference value between the intermediate phase voltage and the minimum phase voltage of the three-phase alternating-current power supply is smaller than the upper-limit voltage setting value or the measured voltage value of the second capacitor C2, in this case the bidirectional switch corresponding to the intermediate phase voltage of the three-phase alternating-current power supply is turned on to connect the intermediate phase voltage to one end of the second capacitor C2, and the minimum phase voltage of the three-phase alternating-current power supply may be connected to the other end of the second capacitor C2 through a diode of a three-phase rectifier bridge 110, such that the voltage applied to two ends of the second capacitor C2 is just the difference value between the intermediate phase voltage and the minimum phase voltage of the three-phase alternating-current power supply, and the difference value is smaller than the upper-limit voltage setting value or the measured voltage value of the second capacitor C2, which can ensure that an actual voltage at two ends the second capacitor C2 will not exceed the upper-limit voltage setting value or the measured voltage value, thus avoiding the second capacitor C2 from being damaged by an overvoltage.

Figure 5:
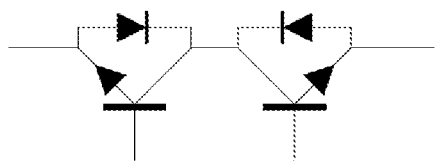
FIG. 5 is a specific structural diagram of a bidirectional switch provided by one embodiment of the present disclosure.

In the three-phase power supply conversion circuit shown in FIG. 1 and FIG. 2 above, each of the first bidirectional switch 121, the second bidirectional switch 122 and the third bidirectional switch 123 includes two power switch transistors reversely connected in parallel to each other, as shown in FIG. 5.

The bidirectional switch including two power switch transistors reversely connected in parallel to each other is used as a fully controlled bidirectional conducting power switch, which can realize bidirectional conduction through a control signal and can also realize bidirectional blocking through a control signal. Specifically, the bidirectional conduction is realized by controlling the two power switch transistors to be turned on at the same time, and the bidirectional blocking is realized by controlling the two power switch transistors to be turned off at the same time.

Figure 6:
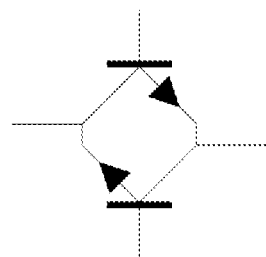
FIG. 6 is a specific structural diagram of a bidirectional switch provided by another embodiment of the present disclosure.

In the three-phase power supply conversion circuit shown in FIG. 1 and FIG. 2 above, each of the first bidirectional switch 121, the second bidirectional switch 122 and the third bidirectional switch 123 may be replaced by two power switch transistors reversely connected in series to each other, and each of the two power switch transistors is reversely connected in parallel to a diode, as shown in FIG. 6.

The bidirectional switch including power switch transistors reversely connected in series to each other which connecting in parallel reversely to diodes is used as a fully controlled bidirectional conducting power switch, which can realize bidirectional conduction through a control signal and can also realize bidirectional blocking through a control signal. Specifically, the bidirectional conduction is realized by controlling the two power switch transistors to be turned on at the same time, and the bidirectional blocking is realized by controlling the two power switch transistors to be turned off at the same time. In addition, the diode may be a fast recovery diode.

Figure 13:
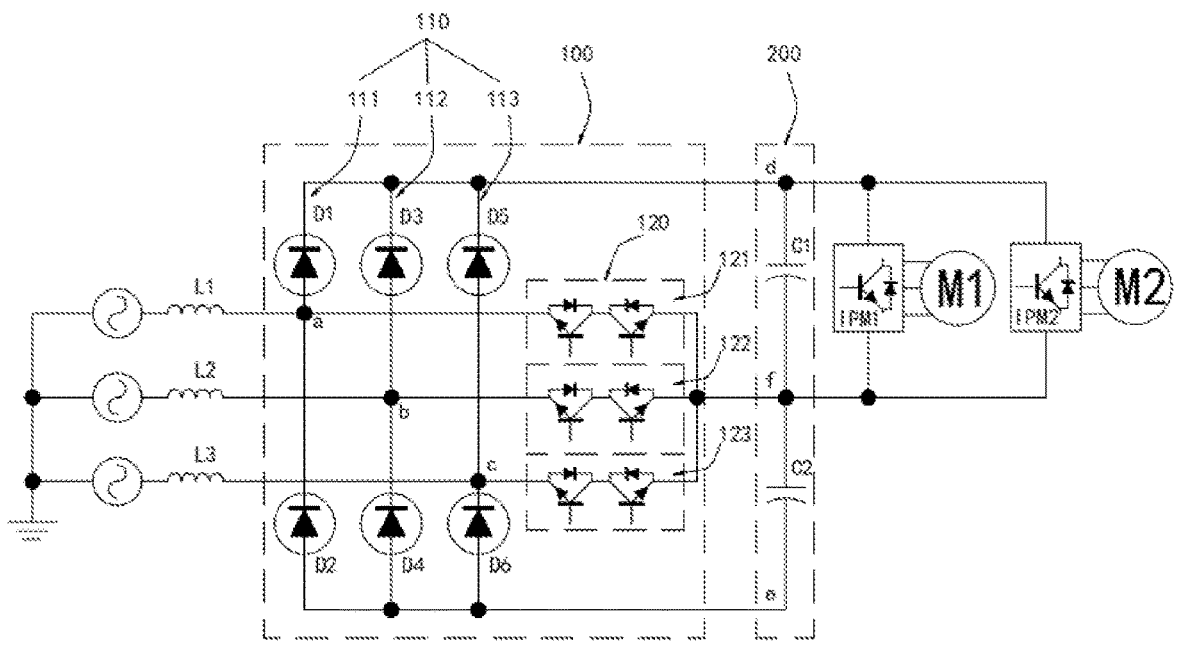
FIG. 13 is a schematic circuit diagram of a sixth case of the first direct-current load in FIG. 1.
Figure 14:
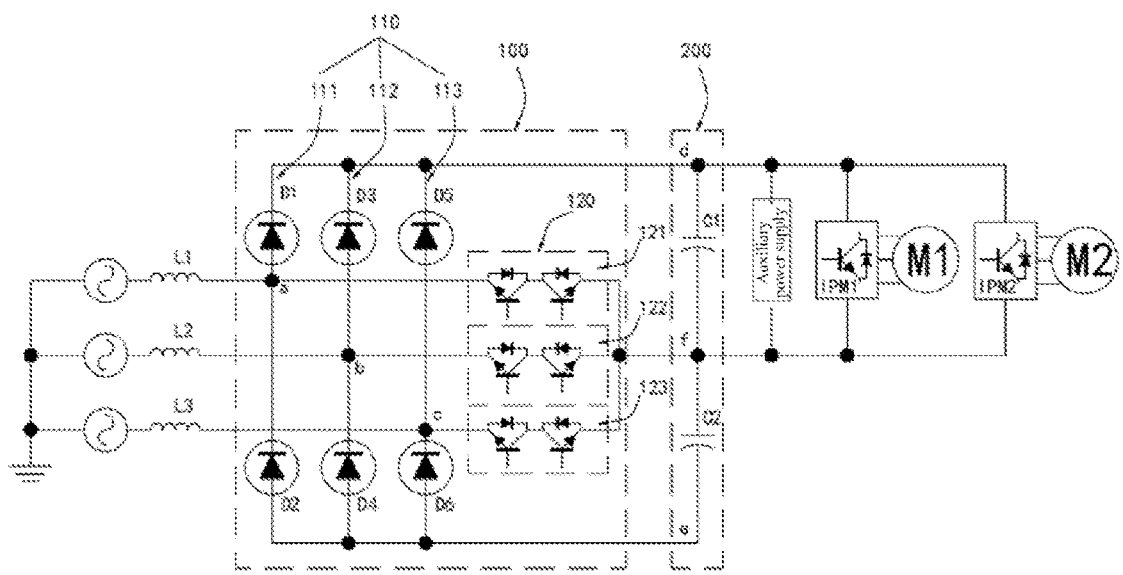
FIG. 14 is a schematic circuit diagram of a seventh case of the first direct-current load in FIG. 1.
Figure 15:
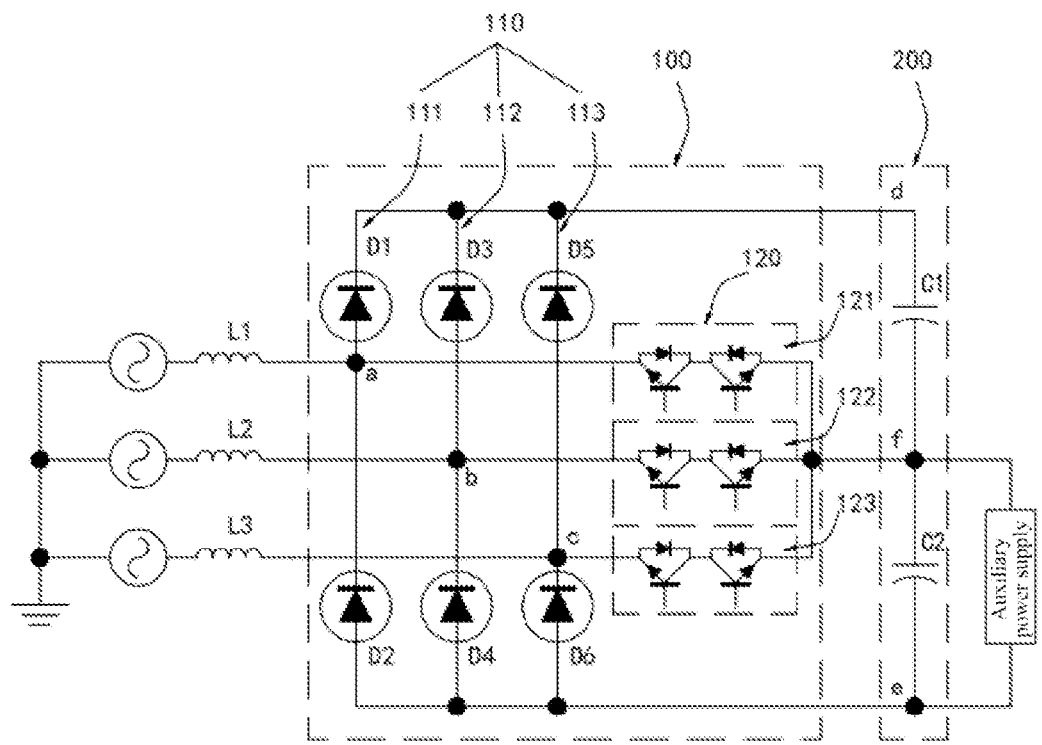
FIG. 15 is a schematic circuit diagram of a first case of a second direct-current load in FIG. 2.
Figure 16:
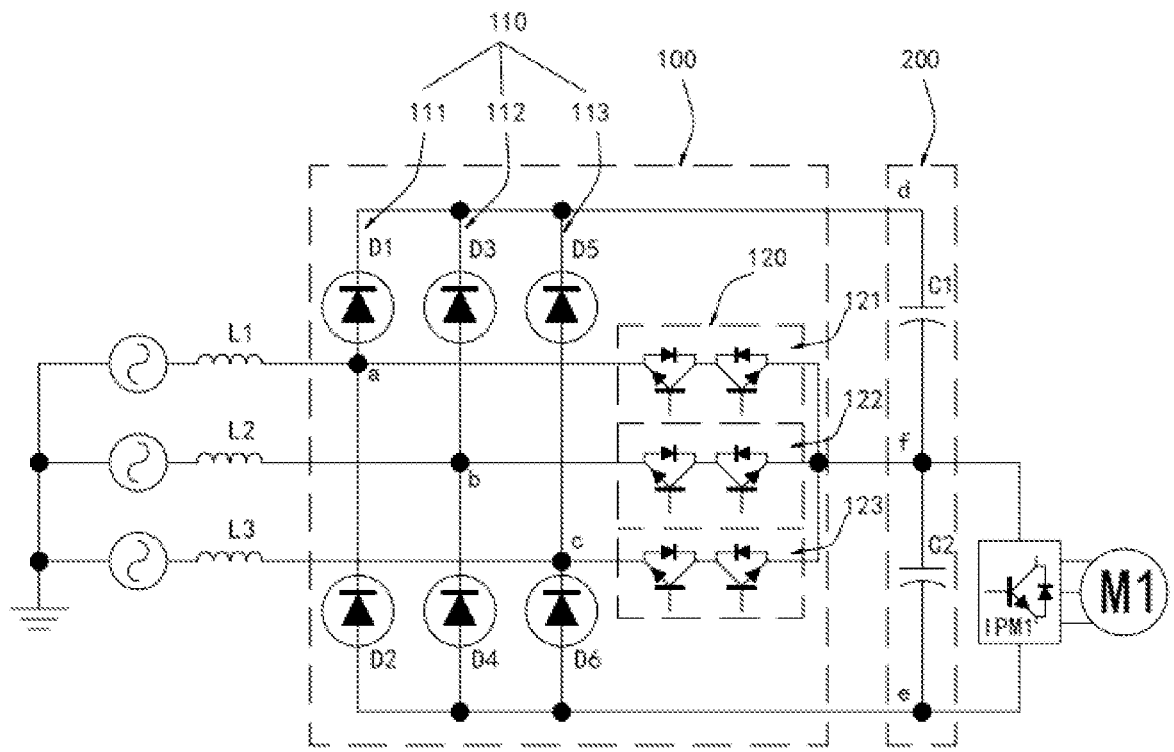
FIG. 16 is a schematic circuit diagram of a second case of the second direct-current load in FIG. 2.
Figure 17:
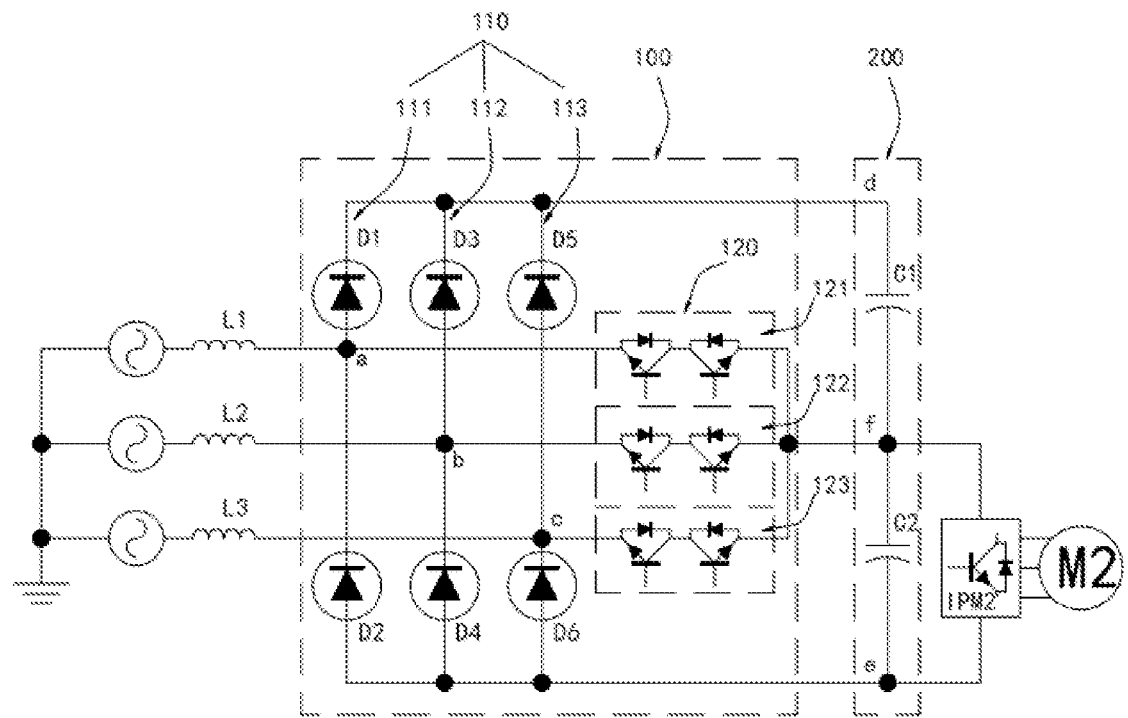
FIG. 17 is a schematic circuit diagram of a third case of the second direct-current load in FIG. 2.
Figure 18:
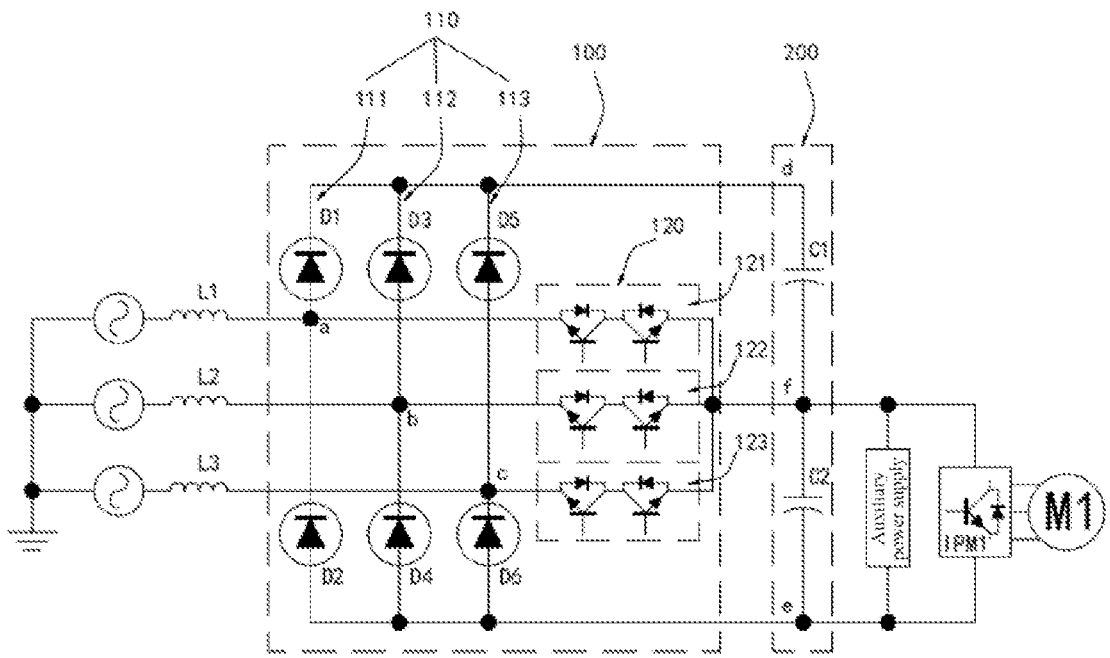
FIG. 18 is a schematic circuit diagram of a fourth case of the second direct-current load in FIG. 2.
Figure 19:
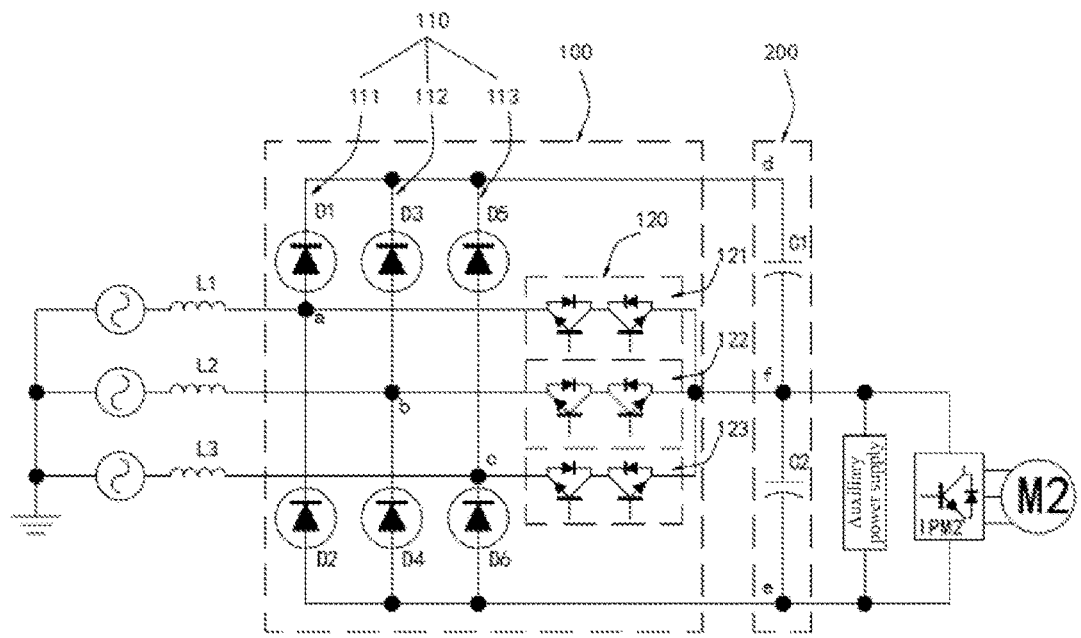
FIG. 19 is a schematic circuit diagram of a fifth case of the second direct-current load in FIG. 2.
Figure 20:
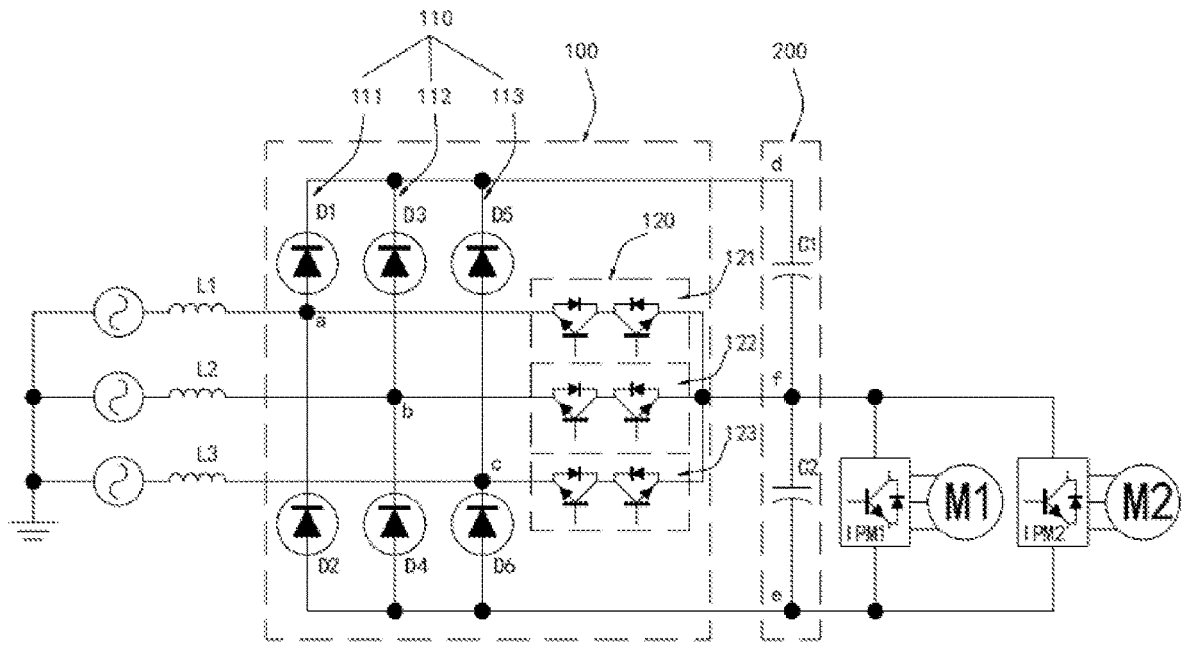
FIG. 20 is a schematic circuit diagram of a sixth case of the second direct-current load in FIG. 2.
Figure 21:
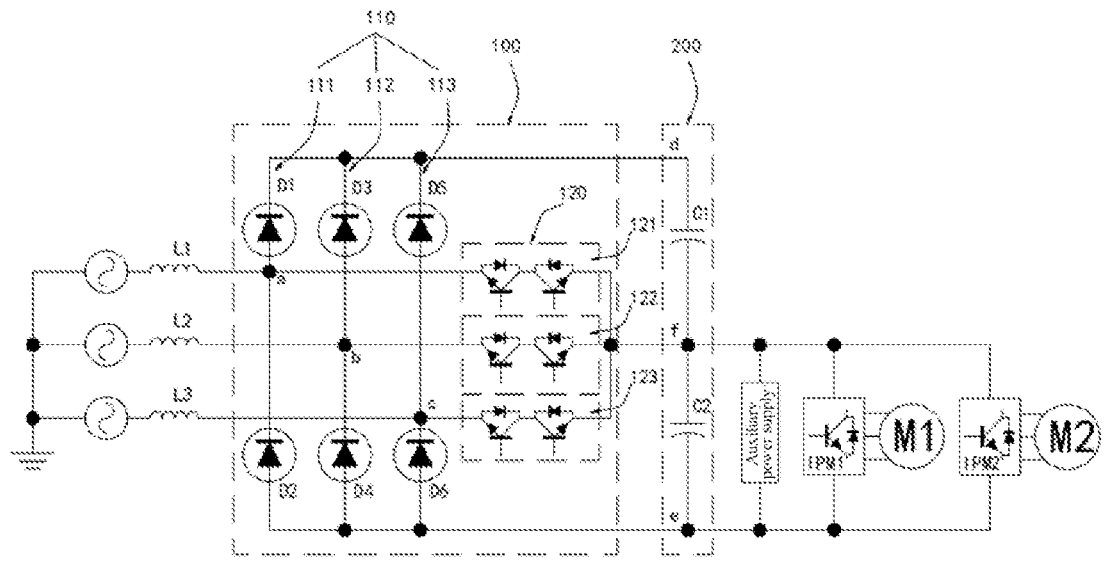
FIG. 21 is a schematic circuit diagram of a seventh case of the second direct-current load in FIG. 2.

In the three-phase power supply conversion circuit shown in FIG. 1 and FIG. 2 above, each of the first bidirectional switch 121, the second bidirectional switch 122 and the third bidirectional switch 123 includes a fourth bridge arm, a fifth bridge arm and a sixth bridge arm which are connected in parallel to each other, the fourth bridge arm and the sixth bridge arm each include two diodes connected in series to each other, and the fifth bridge arm includes a power switch transistor. As shown in FIG. 13, the fourth bridge arm includes a diode D7 and a diode D8 connected in series to each other, the fifth bridge arm includes a power switch transistor Q1, and the sixth bridge arm includes a diode D9 and a diode D10 connected in series to each other. Forward conduction of the first bidirectional switch 121, the second bidirectional switch 122 and the third bidirectional switch 123 is a circulating direction of the diode D7—the power switch transistor Q1—the diode D8, and reverse conduction of the first bidirectional switch 121, the second bidirectional switch 122 and the third bidirectional switch 123 is a circulating direction of the diode D9—the power switch transistor Q1—the diode D10. When the power switch transistor Q1 is turned off, the first bidirectional switch 121, the second bidirectional switch 122 and the third bidirectional switch 123 are in a bidirectional off state.

In a second aspect, an embodiment of the present disclosure provides a circuit control method applied to the three-phase power supply conversion circuit shown in FIG. 1 or FIG. 2, where the three-phase power supply conversion circuit includes a rectifier module 100, an energy storage module 200 and a direct-current load module, the rectifier module 100 includes a three-phase rectifier bridge 110 and a bidirectional switch assembly 120, and the three-phase rectifier bridge 110 includes a first bridge arm 111, a second bridge arm 112 and a third bridge arm 113 which are connected in parallel to each other. The bidirectional switch assembly 120 includes a first bidirectional switch 121, a second bidirectional switch 122 and a third bidirectional switch 123, one end of the first bidirectional switch 121 is connected to a midpoint of the first bridge arm 111, one end of the second bidirectional switch 122 is connected to a midpoint of the second bridge arm 112, and one end of the third bidirectional switch 123 is connected to a midpoint of the third bridge arm 113. The energy storage module 200 is connected to a direct-current output end of the rectifier module 100, the energy storage module 200 includes a first capacitor C1 and a second capacitor C2 which are connected in series to each other, and the other end of the first bidirectional switch 121, the other end of the second bidirectional switch 122 and the other end of the third bidirectional switch 123 are all connected between the first capacitor C1 and the second capacitor C2. The direct-current load module includes a first direct-current load connected in parallel to the first capacitor C1 or a second direct-current load connected in parallel to the second capacitor C2.

The circuit control method includes:

controlling the first bidirectional switch 121, the second bidirectional switch 122 and the third bidirectional switch 123 according to three phase voltages of a three-phase alternating-current power supply, such that a voltage between two ends of the first capacitor C1 or a voltage between two ends of the second capacitor C2 is maintained at a target voltage.

According to the circuit control method provided by the embodiments of the present disclosure, by connecting the first direct-current load in parallel to two ends of the first capacitor C1 or connecting the second direct-current load in parallel to two ends of the second capacitor C2, and controlling the first bidirectional switch 121, the second bidirectional switch 122 and the third bidirectional switch 123 according to the three phase voltages of the three-phase alternating-current power supply, the voltage between two ends of the first capacitor C1 or the voltage between two ends of the second capacitor C2 is maintained at the target voltage, such that the voltage between two ends of the first capacitor C1 or the second capacitor C2 remains stable, which means that direct-current loads with a low voltage level such as a direct-current fan and an auxiliary power supply may be powered through the first capacitor C1 or the second capacitor C2, and three phase currents of the three-phase alternating-current power supply can be balanced, thus avoiding a harmonic of certain one phase current from being significantly large and effectively reducing the harmonic.

Specifically, in the circuit control method above, the controlling the first bidirectional switch 121, the second bidirectional switch 122 and the third bidirectional switch 123 according to the three phase voltages of the three-phase alternating-current power supply, includes:

in response to a difference value between a maximum phase voltage and an intermediate phase voltage of the three-phase alternating-current power supply is smaller than a first voltage value, and a difference value between the intermediate phase voltage and a minimum phase voltage of the three-phase alternating-current power supply is smaller than a second voltage value, controlling on-off of the bidirectional switch assembly 120 with a preset modulation strategy.

The preset modulation strategy is that: a bidirectional switch corresponding to the intermediate phase voltage of the three-phase alternating-current power supply is kept on, a bidirectional switch corresponding to one phase voltage except for the intermediate phase voltage in the three-phase alternating-current power supply is kept off, and a bidirectional switch corresponding to the other phase voltage except for the intermediate phase voltage in the three-phase alternating-current power supply is alternately turned on and off.

The on-off of the bidirectional switch assembly 120 is controlled through the preset modulation strategy within a time range in which the conditions are met: the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value. The first capacitor C1 or the second capacitor C2 is charged within the time range, such that the voltage between two ends of the first capacitor C1 or the second capacitor C2 remains stable, then the direct-current loads with the low voltage level such as the direct-current fan and the auxiliary power supply may be powered through the first capacitor C1 or the second capacitor C2, and the three phase currents of the three-phase alternating-current power supply can be balanced, thus avoiding a harmonic of certain one phase current from being significantly large and effectively reducing the harmonic.

In the circuit control method above, the direct-current load module includes the first direct-current load connected in parallel to the first capacitor C1, and as shown in FIG. 1, the preset modulation strategy is specifically that:

the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off.

When the first direct-current load is connected in parallel to two ends of the first capacitor C1, which means that the first direct-current load is powered through the first capacitor C1, in this case the preset modulation strategy is that: the bidirectional switch corresponding to the minimum phase voltage of the three-phase alternating-current power supply is kept off, the bidirectional switch corresponding to the intermediate phase voltage of the three-phase alternating-current power supply is kept on, and the bidirectional switch corresponding to the maximum phase voltage of the three-phase alternating-current power supply is alternately turned on and off, and thus within the time range in which the conditions that the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value are met, the first capacitor C1 can be charged, such that the voltage of the first capacitor C1 remains stable, and the three phase currents of the three-phase alternating-current power supply can be balanced, thus avoiding a harmonic of certain one phase current from being significantly large and effectively reducing the harmonic.

In the circuit control method above, the direct-current load module includes the second direct-current load connected in parallel to the second capacitor C2, and as shown in FIG. 2, the preset modulation strategy is specifically that:

the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off.

When the second direct-current load is connected in parallel to two ends of the second capacitor C2, which means that the second direct-current load is powered through the second capacitor C2, in this case the preset modulation strategy is that: the bidirectional switch corresponding to the maximum phase voltage of the three-phase alternating-current power supply is kept off, the bidirectional switch corresponding to the intermediate phase voltage of the three-phase alternating-current power supply is kept on, and the bidirectional switch corresponding to the minimum phase voltage of the three-phase alternating-current power supply is alternately turned on and off, and thus within the time range in which the conditions that the difference value between the maximum phase voltage and the intermediate phase voltage of the three-phase alternating-current power supply is smaller than the first voltage value and the difference value between the intermediate phase voltage and the minimum phase voltage of the three-phase alternating-current power supply is smaller than the second voltage value are met, the second capacitor C2 can be charged, such that the voltage of the second capacitor C2 remains stable, and the three phase currents of the three-phase alternating-current power supply can be balanced, thus avoiding a harmonic of certain one phase current from being significantly large and effectively reducing the harmonic.

In the circuit control method above, the first voltage value is a target voltage setting value of the first capacitor C1 or a measured voltage value of the first capacitor C1.

The first voltage value is set to be the target voltage setting value or the measured voltage value of the first capacitor C1, which means that the difference value between the maximum phase voltage and the intermediate phase voltage of the three-phase alternating-current power supply is smaller than the target voltage setting value or the measured voltage value of the first capacitor C1, in this case the bidirectional switch corresponding to the intermediate phase voltage of the three-phase alternating-current power supply is turned on to connect the intermediate phase voltage to one end of the first capacitor C1, and the maximum phase voltage of the three-phase alternating-current power supply may be connected to the other end of the first capacitor C1 through a diode of a three-phase rectifier bridge 110, such that the voltage applied to two ends of the first capacitor C1 is just the difference value between the maximum phase voltage and the intermediate phase voltage of the three-phase alternating-current power supply, and the difference value is smaller than the target voltage setting value or the measured voltage value of the first capacitor C1, which can ensure that an actual voltage at two ends the first capacitor C1 will not exceed the target voltage setting value or the measured voltage value, thus avoiding the first capacitor C1 from being damaged by an overvoltage.

In the circuit control method above, the second voltage value is an upper-limit voltage setting value of the second capacitor C2 or a measured voltage value of the second capacitor C2.

The second voltage value is set to be the upper-limit voltage setting value or the measured voltage value of the second capacitor C2, which means that the difference value between the intermediate phase voltage and the minimum phase voltage of the three-phase alternating-current power supply is smaller than the upper-limit voltage setting value or the measured voltage value of the second capacitor C2, in this case the bidirectional switch corresponding to the intermediate phase voltage of the three-phase alternating-current power supply is turned on to connect the intermediate phase voltage to one end of the second capacitor C2, and the minimum phase voltage of the three-phase alternating-current power supply may be connected to the other end of the second capacitor C2 through a diode of a three-phase rectifier bridge 110, such that the voltage applied to two ends of the second capacitor C2 is just the difference value between the intermediate phase voltage and the minimum phase voltage of the three-phase alternating-current power supply, and the difference value is smaller than the upper-limit voltage setting value or the measured voltage value of the second capacitor C2, which can ensure that an actual voltage at two ends the second capacitor C2 will not exceed the upper-limit voltage setting value or the measured voltage value, thus avoiding the second capacitor C2 from being damaged by an overvoltage.

In a third aspect, an embodiment of the present disclosure provides a circuit board, which includes the three-phase power supply conversion circuit according to the embodiment in the first aspect of the present disclosure.

According to the circuit board provided by the embodiments of the present disclosure, by connecting the first direct-current load in parallel to two ends of the first capacitor C1 or connecting the second direct-current load in parallel to two ends of the second capacitor C2, and controlling the first bidirectional switch 121, the second bidirectional switch 122 and the third bidirectional switch 123 according to the three phase voltages of the three-phase alternating-current power supply, the voltage between two ends of the first capacitor C1 or the voltage between two ends of the second capacitor C2 is maintained at the target voltage, such that the voltage between two ends of the first capacitor C1 or the second capacitor C2 remains stable, which means that direct-current loads with a low voltage level such as a direct-current fan and an auxiliary power supply may be powered through the first capacitor C1 or the second capacitor C2, and three phase currents of the three-phase alternating-current power supply can be balanced, thus avoiding a harmonic of certain one phase current from being significantly large and effectively reducing the harmonic.

Figure 7:
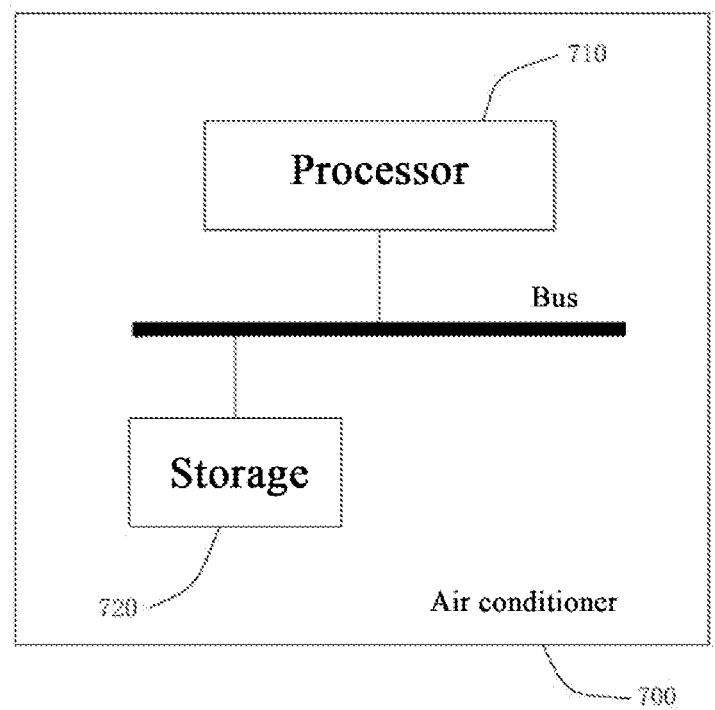
FIG. 7 is a structural diagram of an operation control device provided by an embodiment of the present disclosure.
Figure 8:
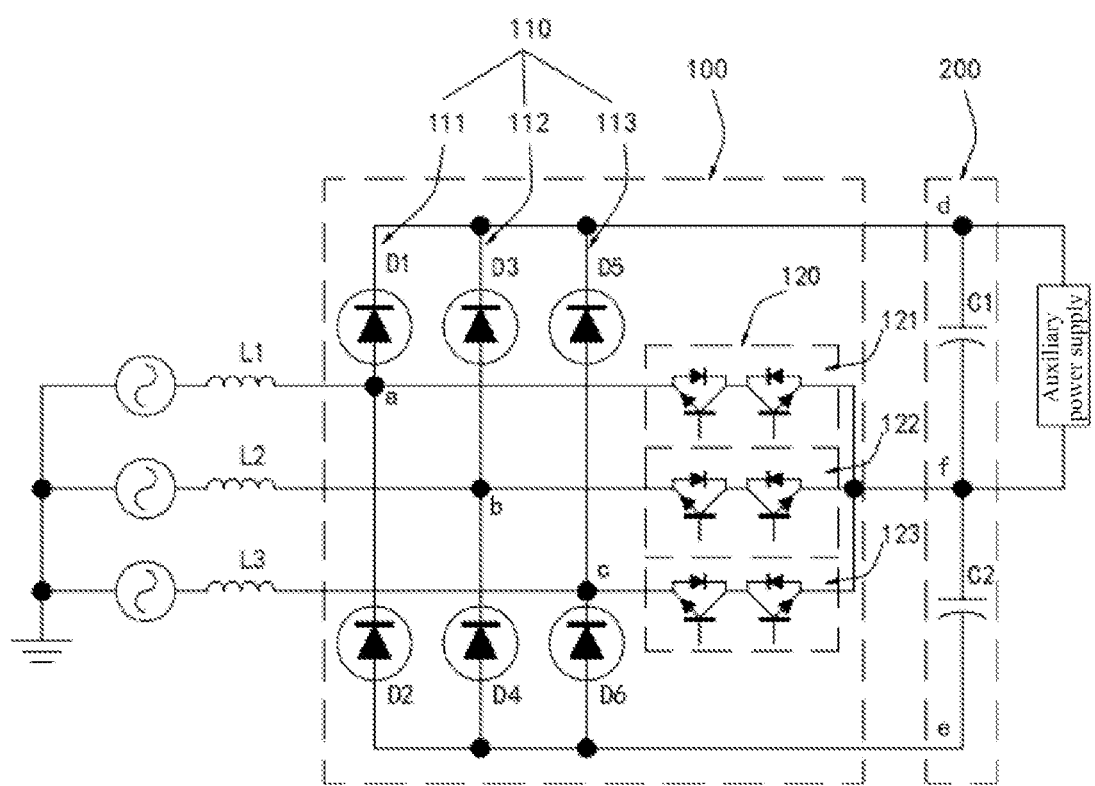
FIG. 8 is a schematic circuit diagram of a first case of a first direct-current load in FIG. 1.
Figure 9:
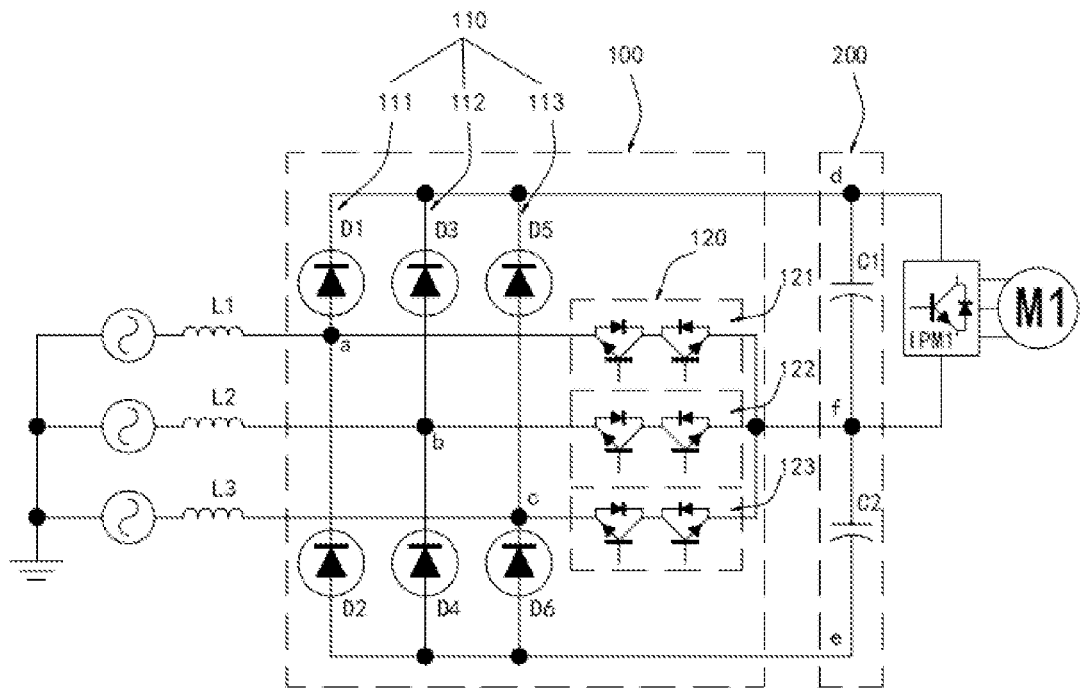
FIG. 9 is a schematic circuit diagram of a second case of the first direct-current load in FIG. 1.
Figure 10:
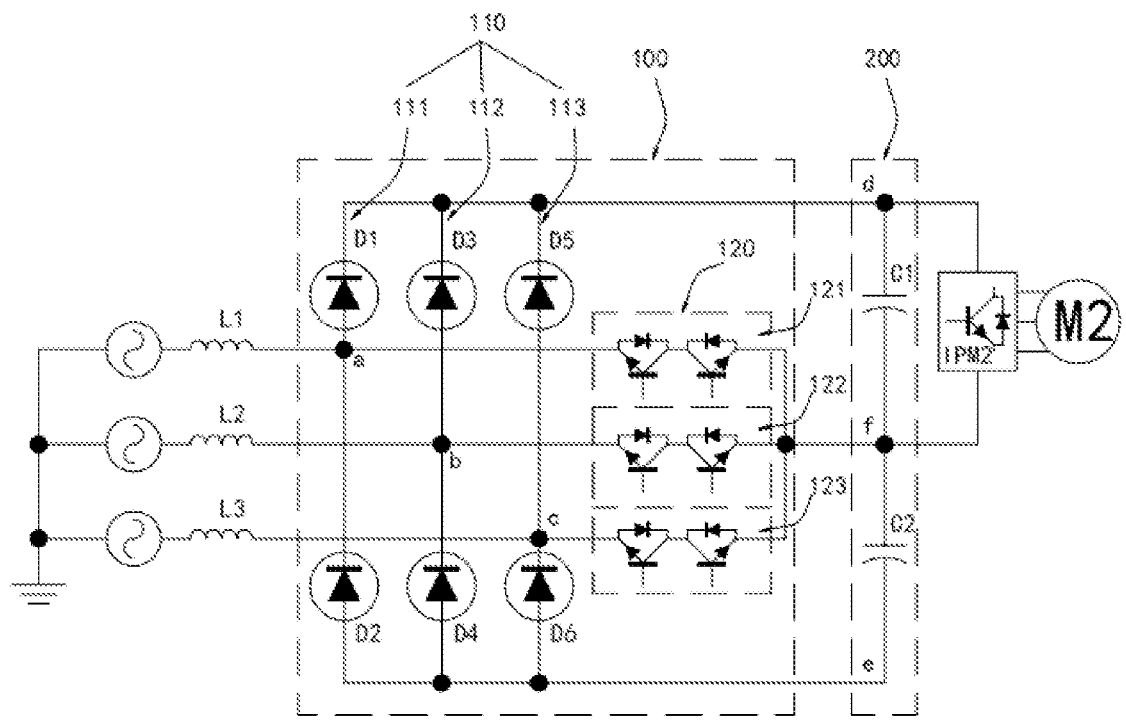
FIG. 10 is a schematic circuit diagram of a third case of the first direct-current load in FIG. 1.
Figure 11:
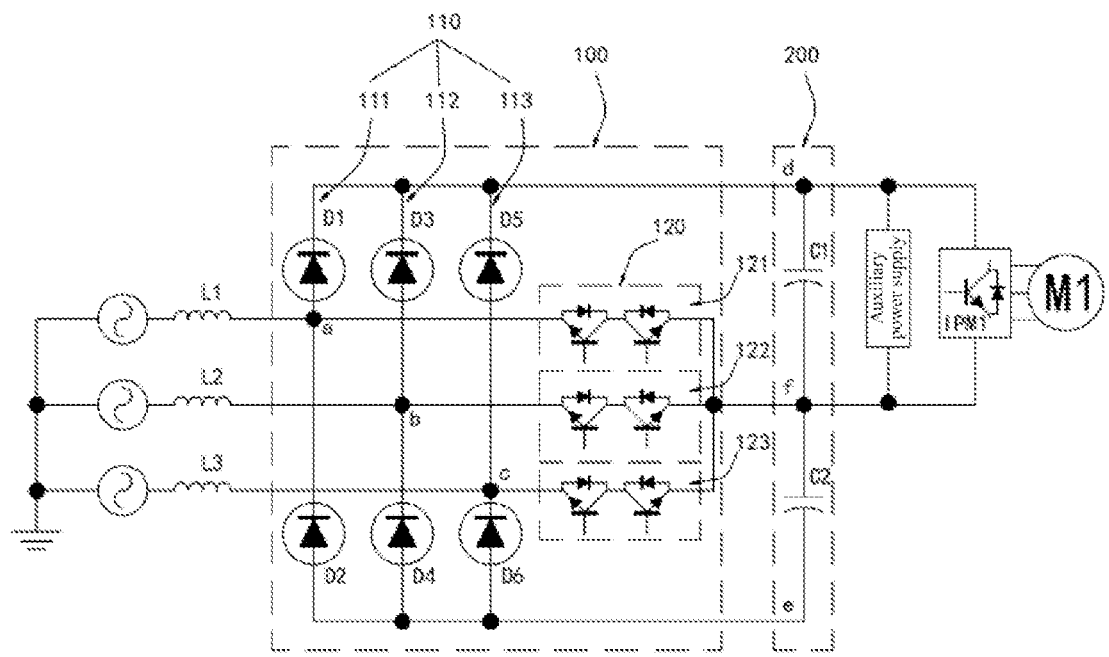
FIG. 11 is a schematic circuit diagram of a fourth case of the first direct-current load in FIG. 1.
Figure 12:
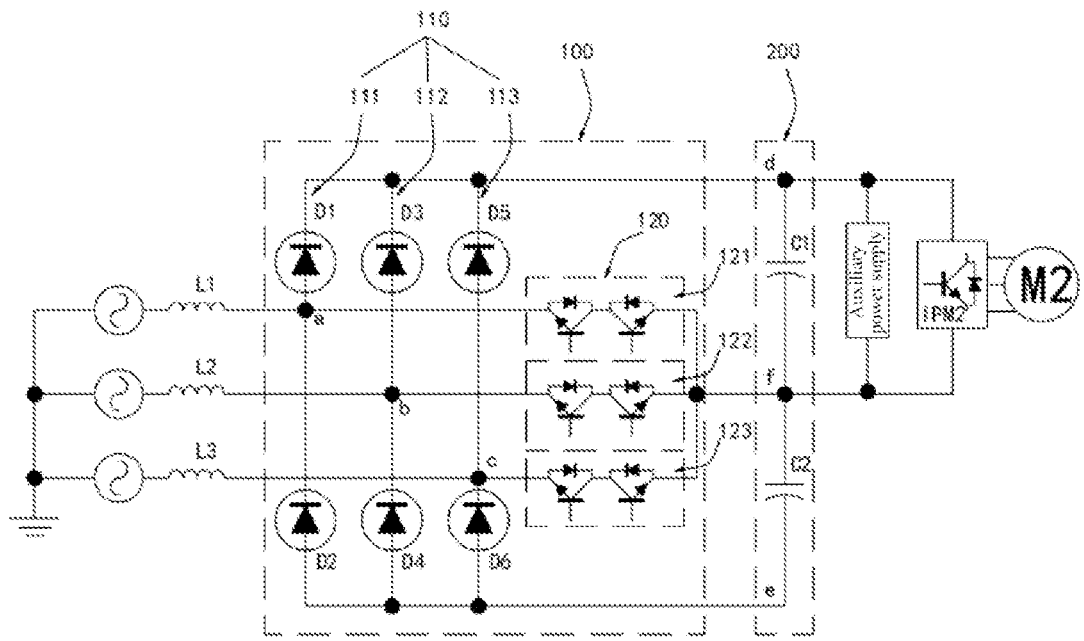
FIG. 12 is a schematic circuit diagram of a fifth case of the first direct-current load in FIG. 1.

In a fourth aspect, with reference to FIG. 7, an embodiment of the present disclosure provides an operation control device 700, which includes at least one processor 710 and a storage 720 used for communicating with the at least one processor 710, where the storage 720 stores an instruction executable by the at least one processor 710, and the instruction is executed by the at least one processor 710, such that the at least one processor 710 is capable of executing the circuit control method according to the embodiment in the second aspect of the present disclosure.

According to the operation control device 700 provided by the embodiments of the present disclosure, by connecting the first direct-current load in parallel to two ends of the first capacitor C1 or connecting the second direct-current load in parallel to two ends of the second capacitor C2, and controlling the first bidirectional switch 121, the second bidirectional switch 122 and the third bidirectional switch 123 according to the three phase voltages of the three-phase alternating-current power supply, the voltage between two ends of the first capacitor C1 or the voltage between two ends of the second capacitor C2 is maintained at the target voltage, such that the voltage between two ends of the first capacitor C1 or the second capacitor C2 remains stable, which means that direct-current loads with a low voltage level such as a direct-current fan and an auxiliary power supply may be powered through the first capacitor C1 or the second capacitor C2, and three phase currents of the three-phase alternating-current power supply can be balanced, thus avoiding a harmonic of certain one phase current from being significantly large and effectively reducing the harmonic.

In a fifth aspect, an embodiment of the present disclosure provides an air conditioner, which includes the circuit board according to the embodiment in the third aspect of the present disclosure or the operation control device 700 according to the embodiment in the fourth aspect of the present disclosure.

According to the air conditioner provided by the embodiments of the present disclosure, by connecting the first direct-current load in parallel to two ends of the first capacitor C1 or connecting the second direct-current load in parallel to two ends of the second capacitor C2, and controlling the first bidirectional switch 121, the second bidirectional switch 122 and the third bidirectional switch 123 according to the three phase voltages of the three-phase alternating-current power supply, the voltage between two ends of the first capacitor C1 or the voltage between two ends of the second capacitor C2 is maintained at the target voltage, such that the voltage between two ends of the first capacitor C1 or the second capacitor C2 remains stable, which means that direct-current loads with a low voltage level such as a direct-current fan and an auxiliary power supply may be powered through the first capacitor C1 or the second capacitor C2, and three phase currents of the three-phase alternating-current power supply can be balanced, thus avoiding a harmonic of certain one phase current from being significantly large and effectively reducing the harmonic.

In a sixth aspect, an embodiment of the present disclosure provides a computer-readable storage medium, where the computer-readable storage medium stores a computer-executable instruction, and the computer-executable instruction is used for enabling a computer to execute the circuit control method according to the embodiment in the second aspect of the present disclosure.

According to the computer-readable storage medium provided by the embodiments of the present disclosure, by connecting the first direct-current load in parallel to two ends of the first capacitor C1 or connecting the second direct-current load in parallel to two ends of the second capacitor C2, and controlling the first bidirectional switch 121, the second bidirectional switch 122 and the third bidirectional switch 123 according to the three phase voltages of the three-phase alternating-current power supply, the voltage between two ends of the first capacitor C1 or the voltage between two ends of the second capacitor C2 is maintained at the target voltage, such that the voltage between two ends of the first capacitor C1 or the second capacitor C2 remains stable, which means that direct-current loads with a low voltage level such as a direct-current fan and an auxiliary power supply may be powered through the first capacitor C1 or the second capacitor C2, and three phase currents of the three-phase alternating-current power supply can be balanced, thus avoiding a harmonic of certain one phase current from being significantly large and effectively reducing the harmonic.

Those of ordinary skilled in the art can understand that all or some of steps and systems in the method disclosed above can be implemented as software, firmware, hardware and appropriate combinations thereof. Some or all of the physical components can be implemented as software executed by a processor, such as a central processing unit, a digital signal processor or a microprocessor, or implemented as hardware, or implemented as an integrated circuit, such as an application-specific integrated circuit. Such software can be distributed on a computer-readable medium, and the computer-readable medium may include a computer storage medium (or a non-transitory medium) and a communication medium (or a transitory medium). As well known to those of ordinary skills in the art, the term 'computer storage medium' includes a volatile and nonvolatile, removable and non-removable medium implemented in any method or technology for storing information (such as a computer readable instruction, a data structure, a program module, or other data). The computer storage media include but are not limited to RAM, ROM, EEPROM, flash storage or other storage technologies, CD-ROM, digital versatile disk (DVD) or other optical disk storage, magnetic box, magnetic tape, magnetic disk storage or other magnetic storage devices, or any other media capable of being used to store desired information and accessed by a computer. Furthermore, it is well known to those of ordinary skills in the art that the communication media typically include a computer readable instruction, a data structure, a program module or other data in a modulated data signal such as a carrier wave or other transmission mechanism, and may include any information delivery medium.

The embodiments of the present disclosure have been described in detail above with reference to the accompanying drawings, but the present disclosure is not limited to the embodiments described above, and various changes can be made without departing from the spirits of the present disclosure within the scope of knowledge possessed by those of ordinary skill in the art.

What is claimed is:

1. A three-phase power supply conversion circuit comprising:
   a rectifier module including:
      a three-phase rectifier bridge including a first bridge arm, a second bridge arm, and a third bridge arm connected in parallel to each other; and
      a bidirectional switch assembly including a first bidirectional switch, a second bidirectional switch, and a third bidirectional switch, one end of the first bidirectional switch being connected to a midpoint of the first bridge arm, one end of the second bidirectional switch being connected to a midpoint of the second bridge arm, and one end of the third bidirectional switch being connected to a midpoint of the third bridge arm;
   an energy storage module connected to a direct-current output end of the rectifier module and including a first capacitor and a second capacitor connected in series to each other, another end of the first bidirectional switch, another end of the second bidirectional switch, and another end of the third bidirectional switch being all connected between the first capacitor and the second capacitor;
   a direct-current load module including a first direct-current load connected in parallel to the first capacitor or a second direct-current load connected in parallel to the second capacitor; and
   a control module connected to the bidirectional switch assembly and configured to control the first bidirectional switch, the second bidirectional switch, and the third bidirectional switch according to three phase voltages of a three-phase alternating-current power supply, to maintain a voltage between two ends of the first capacitor or a voltage between two ends of the second capacitor at a target voltage.

2. The three-phase power supply conversion circuit according to claim 1, wherein:
the control module is configured to, in response to a difference value between a maximum phase voltage and an intermediate phase voltage of the three-phase alternating-current power supply being smaller than a first voltage value, and a difference value between the intermediate phase voltage and a minimum phase voltage of the three-phase alternating-current power supply being smaller than a second voltage value, controlling on-off of the bidirectional switch assembly with a preset modulation strategy; and
the preset modulation strategy is that:
a bidirectional switch of the first bidirectional switch, the second bidirectional switch, and the third bidirectional switch that corresponds to the intermediate phase voltage is kept on,
a bidirectional switch of the first bidirectional switch, the second bidirectional switch, and the third bidirectional switch that corresponds to one of the maximum phase voltage and the minimum phase voltage is kept off, and
a bidirectional switch of the first bidirectional switch, the second bidirectional switch, and the third bidirectional switch that corresponds to another one of the maximum phase voltage and the minimum phase voltage is alternately turned on and off.

3. The three-phase power supply conversion circuit according to claim 2, wherein the direct-current load module includes the first direct-current load connected in parallel to the first capacitor, and the preset modulation strategy is that:
the bidirectional switch corresponding to the minimum phase voltage is kept off,
the bidirectional switch corresponding to the intermediate phase voltage is kept on, and
the bidirectional switch corresponding to the maximum phase voltage is alternately turned on and off.

4. The three-phase power supply conversion circuit according to claim 2, wherein the direct-current load module includes the second direct-current load connected in parallel to the second capacitor, and the preset modulation strategy is that:
the bidirectional switch corresponding to the maximum phase voltage is kept off,
the bidirectional switch corresponding to the intermediate phase voltage is kept on, and
the bidirectional switch corresponding to the minimum phase voltage is alternately turned on and off.

5. The three-phase power supply conversion circuit according to claim 2, wherein the first voltage value is a target voltage setting value of the first capacitor or a measured voltage value of the first capacitor.

6. The three-phase power supply conversion circuit according to claim 2, wherein the second voltage value is an upper-limit voltage setting value of the second capacitor or a measured voltage value of the second capacitor.

7. The three-phase power supply conversion circuit according to claim 1, wherein each of the first bidirectional switch, the second bidirectional switch, and the third bidirectional switch includes two power switch transistors reversely connected in parallel to each other.

8. The three-phase power supply conversion circuit according to claim 1, wherein each of the first bidirectional switch, the second bidirectional switch, and the third bidirectional switch includes two power switch transistors reversely connected in series to each other, and each of the two power switch transistors is reversely connected in parallel to a diode.

9. The three-phase power supply conversion circuit according to claim 1, wherein each of the first bidirectional switch, the second bidirectional switch, and the third bidirectional switch includes a fourth bridge arm, a fifth bridge arm, and a sixth bridge arm connected in parallel to each other, the fourth bridge arm and the sixth bridge arm each include two diodes connected in series to each other, and the fifth bridge arm includes a power switch transistor.

10. A circuit board comprising the three-phase power supply conversion circuit according to claim 1.

11. An air conditioner comprising the circuit board according to claim 10.

12. A circuit control method applied to a three-phase power supply conversion circuit that includes a rectifier module, an energy storage module, and a direct-current load module, the rectifier module including a three-phase rectifier bridge and a bidirectional switch assembly, the three-phase rectifier bridge including a first bridge arm, a second bridge arm, and a third bridge arm connected in parallel to each other, the bidirectional switch assembly including a first bidirectional switch, a second bidirectional switch, and a third bidirectional switch, one end of the first bidirectional switch being connected to a midpoint of the first bridge arm, one end of the second bidirectional switch being connected to a midpoint of the second bridge arm, and one end of the third bidirectional switch being connected to a midpoint of the third bridge arm, the energy storage module being connected to a direct-current output end of the rectifier module and including a first capacitor and a second capacitor connected in series to each other, another end of the first bidirectional switch, another end of the second bidirectional switch, and another end of the third bidirectional switch are all connected between the first capacitor and the second capacitor, and the direct-current load module including a first direct-current load connected in parallel to the first capacitor or a second direct-current load connected in parallel to the second capacitor, the method comprising:
controlling the first bidirectional switch, the second bidirectional switch, and the third bidirectional switch according to three phase voltages of a three-phase alternating-current power supply, to maintain a voltage between two ends of the first capacitor or a voltage between two ends of the second capacitor at a target voltage.

13. The circuit control method according to claim 12, wherein:
controlling the first bidirectional switch, the second bidirectional switch, and the third bidirectional switch includes:
in response to a difference value between a maximum phase voltage and an intermediate phase voltage of the three-phase alternating-current power supply being smaller than a first voltage value, and a difference value between the intermediate phase voltage and a minimum phase voltage of the three-phase alternating-current power supply being smaller than a second voltage value, controlling turning on and off of the bidirectional switch assembly with a preset modulation strategy; and
the preset modulation strategy is that:

a bidirectional switch of the first bidirectional switch, the second bidirectional switch, and the third bidirectional switch that corresponds to the intermediate phase voltage is kept on, a bidirectional switch of the first bidirectional switch, the second bidirectional switch, and the third bidirectional switch that corresponds to one of the maximum phase voltage and the minimum phase voltage is kept off, and a bidirectional switch of the first bidirectional switch, the second bidirectional switch, and the third bidirectional switch that corresponds to another one of the maximum phase voltage and the minimum phase voltage is alternately turned on and off.

14. The circuit control method according to claim 13, wherein the direct-current load module includes the first direct-current load connected in parallel to the first capacitor, and the preset modulation strategy is that:

the bidirectional switch corresponding to the minimum phase voltage is kept off, the bidirectional switch corresponding to the intermediate phase voltage is kept on, and the bidirectional switch corresponding to the maximum phase voltage is alternately turned on and off.

15. The circuit control method according to claim 13, wherein the direct-current load module includes the second direct-current load connected in parallel to the second capacitor, and the preset modulation strategy is specifically that:

the bidirectional switch corresponding to the maximum phase voltage is kept off, the bidirectional switch corresponding to the intermediate phase voltage is kept on, and the bidirectional switch corresponding to the minimum phase voltage is alternately turned on and off.

16. The circuit control method according to claim 13, wherein the first voltage value is a target voltage setting value of the first capacitor or a measured voltage value of the first capacitor.

17. The circuit control method according to claim 13, wherein the second voltage value is an upper-limit voltage setting value of the second capacitor or a measured voltage value of the second capacitor.

18. A non-transitory computer-readable storage medium storing computer-executable instructions that, when executed by a computer, cause the computer to perform the circuit control method according to claim 12.

19. An operation control device comprising:
at least one processor; and
a storage communicating with the at least one processor and storing instructions that, when executed by the at least one processor, cause the at least one processor to control a three-phase power supply conversion circuit;

wherein the three-phase power supply conversion circuit includes:

a rectifier module including:

a three-phase rectifier bridge including a first bridge arm, a second bridge arm, and a third bridge arm connected in parallel to each other; and a bidirectional switch assembly including a first bidirectional switch, a second bidirectional switch, and a third bidirectional switch, one end of the first bidirectional switch being connected to a midpoint of the first bridge arm, one end of the second bidirectional switch being connected to a midpoint of the second bridge arm, and one end of the third bidirectional switch being connected to a midpoint of the third bridge arm;

an energy storage module connected to a direct-current output end of the rectifier module and including a first capacitor and a second capacitor connected in series to each other, another end of the first bidirectional switch, another end of the second bidirectional switch, and another end of the third bidirectional switch being all connected between the first capacitor and the second capacitor;

a direct-current load module including a first direct-current load connected in parallel to the first capacitor or a second direct-current load connected in parallel to the second capacitor; and a control module connected to the bidirectional switch assembly and configured to control the first bidirectional switch, the second bidirectional switch, and the third bidirectional switch according to three phase voltages of a three-phase alternating-current power supply, to maintain a voltage between two ends of the first capacitor or a voltage between two ends of the second capacitor at a target voltage; and the instructions cause the at least one processor to control the first bidirectional switch, the second bidirectional switch, and the third bidirectional switch according to three phase voltages of a three-phase alternating-current power supply, to maintain a voltage between two ends of the first capacitor or a voltage between two ends of the second capacitor at a target voltage.

* * * * *